(12) United States Patent
Fugate et al.

(10) Patent No.: US 10,347,096 B2
(45) Date of Patent: Jul. 9, 2019

(54) ELECTRONIC BEACON

(71) Applicants: Timmy Lee Fugate, Lathrop, CA (US); Susan Lynn Fugate, Lathrop, CA (US)

(72) Inventors: Timmy Lee Fugate, Lathrop, CA (US); Susan Lynn Fugate, Lathrop, CA (US)

( * ) Notice: Subject to any disclaimer, the term of this patent is extended or adjusted under 35 U.S.C. 154(b) by 0 days.

(21) Appl. No.: 15/607,156

(22) Filed: May 26, 2017

(65) Prior Publication Data

US 2017/0263087 A1 Sep. 14, 2017

Related U.S. Application Data

(62) Division of application No. 14/575,946, filed on Dec. 18, 2014, now Pat. No. 9,691,239.

(60) Provisional application No. 61/922,011, filed on Dec. 30, 2013.

(51) Int. Cl.
*G08B 7/06* (2006.01)
*G08B 21/24* (2006.01)
*F16B 2/00* (2006.01)

(52) U.S. Cl.
CPC ............... *G08B 7/06* (2013.01); *G08B 21/24* (2013.01); *F16B 2/00* (2013.01)

(58) Field of Classification Search
None
See application file for complete search history.

(56) References Cited

U.S. PATENT DOCUMENTS

| | | | |
|---|---|---|---|
| 3,781,861 A | 12/1973 | Adler, Jr. et al. | |
| 4,598,339 A | 7/1986 | Ainsworth | |
| 5,510,768 A | 4/1996 | Mann | |
| 5,617,074 A | 4/1997 | White | |
| 5,640,147 A | 6/1997 | Chek et al. | |
| 5,652,569 A | 7/1997 | Gerstenberger et al. | |
| 5,673,023 A | 9/1997 | Smith | |
| 5,680,105 A | 10/1997 | Hedrick | |
| 5,689,240 A | 11/1997 | Traxler | |
| 5,865,524 A * | 2/1999 | Campman | F21L 4/02 362/102 |
| 5,936,530 A | 8/1999 | Meinhold | |
| 5,955,965 A | 9/1999 | Calandruccio | |
| 6,147,602 A | 11/2000 | Bender | |
| 6,212,133 B1 | 4/2001 | McCoy et al. | |

(Continued)

FOREIGN PATENT DOCUMENTS

| | | |
|---|---|---|
| EP | 1 394 029 A2 | 3/2004 |
| EP | 1 508 513 A1 | 2/2005 |

(Continued)

*Primary Examiner* — Daniell L Negron
(74) *Attorney, Agent, or Firm* — Seed IP Law Group LLP

(57) ABSTRACT

Systems and methods for marking and locating objects in crowded environments, and more particularly, systems and methods that include a remote configured to communicate with a beacon having audio and visual indicators, are shown and described. One system comprises a remote including a housing, a tool extending from the housing, a movable sleeve configured to cover the tool, a first control circuit, a selection button coupled to the control circuit, a first transceiver, and a beacon including a second transceiver configured to communicate with the first transceiver, a second control circuit, an indicator electrically coupled to the second control circuit, and a latch mechanism, the tool configured to interact with the latch mechanism to securely couple the beacon.

4 Claims, 17 Drawing Sheets

(56) References Cited

U.S. PATENT DOCUMENTS

| | | |
|---|---|---|
| 6,265,974 B1 | 7/2001 | D'Angelo et al. |
| 6,278,370 B1 | 8/2001 | Underwood |
| 6,304,183 B1 | 10/2001 | Causey |
| 6,462,658 B1 | 10/2002 | Bender |
| 6,501,378 B1 | 12/2002 | Knaven |
| 6,572,249 B2 | 6/2003 | Bailey |
| 6,674,364 B1 | 1/2004 | Holbrook et al. |
| 6,690,267 B2 | 2/2004 | Linden et al. |
| 6,764,133 B2 | 7/2004 | Osato |
| 6,992,588 B1 | 1/2006 | Santosstefano |
| D536,265 S | 2/2007 | Reynoso |
| 8,207,852 B2 | 6/2012 | Oehlert et al. |
| 8,344,891 B2 | 1/2013 | Appalucci et al. |
| 2002/0089193 A1 | 7/2002 | Terasawa et al. |
| 2004/0046658 A1 | 3/2004 | Turner et al. |
| 2004/0145975 A1 | 7/2004 | Barras et al. |
| 2004/0198382 A1 | 10/2004 | Wong |
| 2009/0009326 A1* | 1/2009 | Veiga, III ............... G08B 25/08 340/541 |
| 2009/0284370 A1 | 11/2009 | Gurman |
| 2011/0026368 A1 | 2/2011 | Relyea |
| 2012/0242471 A1 | 9/2012 | Tsai |
| 2012/0243245 A1 | 9/2012 | Smith et al. |
| 2012/0326875 A1 | 12/2012 | Coppola |
| 2013/0021811 A1 | 1/2013 | Goldwater |
| 2013/0051186 A1 | 2/2013 | Honda et al. |
| 2014/0057646 A1 | 2/2014 | Vaananen |
| 2014/0114222 A1 | 4/2014 | Volker |
| 2015/0084766 A1 | 3/2015 | Cordaro et al. |

FOREIGN PATENT DOCUMENTS

| | | |
|---|---|---|
| EP | 1 699 183 A1 | 9/2006 |
| EP | 1 232 920 B1 | 11/2006 |
| EP | 1 422 975 B9 | 4/2010 |
| EP | 2 221 241 A1 | 8/2010 |
| EP | 2 027 413 B1 | 1/2011 |
| EP | 2 420 903 A2 | 2/2012 |
| EP | 1 428 415 B1 | 7/2012 |
| EP | 2 474 872 A2 | 7/2012 |
| EP | 2 431 030 B1 | 4/2013 |
| EP | 2 579 107 A1 | 4/2013 |
| WO | 97/01154 A1 | 1/1997 |
| WO | 00/38256 A1 | 6/2000 |
| WO | 03/005484 A1 | 1/2003 |
| WO | 2004/095396 A1 | 11/2004 |
| WO | 2005/079042 A1 | 8/2005 |
| WO | 2005/083546 A1 | 9/2005 |
| WO | 20009/010065 A2 | 1/2009 |
| WO | 2009/142647 A2 | 11/2009 |
| WO | 2010/029287 A1 | 3/2010 |
| WO | 2010/092356 A1 | 8/2010 |

* cited by examiner

ELECTRONIC BEACON

BACKGROUND

Technical Field

The present disclosure relates to systems and methods for marking and locating objects in crowded environments, and more particularly, to systems that include a remote that is configured to communicate with a beacon having audio and/or visual indicators.

Description of the Related Art

Keeping track of and finding a stroller or bike amongst many dozens or hundreds of such items parked at a zoo, office building, park, or transit station can be a frustrating task. The task of finding a stroller or bike parked in one of these crowded environments can be particularly daunting when other people may have moved or rearranged the items. Finding your stroller or bike is difficult enough when its exactly where you left it, but is even more difficult when it's been moved by a park attendant or another patron.

Similarly, the constant mindfulness a parent must have to keep track of their children while out of the house can be an arduous task. Multiple children and multiple strollers in one of these crowded environments can be a stressful endeavor.

People have employed numerous methods of keeping track of their belongings and their children. These range from the simple, such as tying a distinctive ribbon or strap around a luggage handle to make one black bag stand out amongst all the other black luggage bags, to the more complex and sometimes humiliating, such as attaching a leash to a child. The leash also presents other problems, such as accidentally tangling up a stranger or getting caught on other objects, and the parent still must be constantly aware of where the child is walking and where the leash is stretching in order to prevent entanglement. Even with these drawbacks, parents will agree that these problems are far better than the panic felt by both the parent and the child when the two become separated in a crowded and unfamiliar place.

BRIEF SUMMARY

The present disclosure is directed to systems and methods for locating personal items in crowded environments. One system includes a beacon that is attached to a stroller, bike, or other object and a remote used to activate the beacon to keep track of or find the object.

The present disclosure is also directed to systems and devices for communicating with or locating a child. One system includes a remote and a beacon. The beacon could be attached to the child's wrist and activated to indicate to the child that it is time to return to the parents. Alternatively, when activated, the beacon generates a selected audio and visual indication so that the parent and locate the child in a crowd.

The remote can include a housing, a tool extending from the housing, a retractable sleeve configured to cover and uncover the tool, a first control circuit, a selection button coupled to the control circuit, and a first transceiver. The beacon can include a second transceiver configured to communicate with the first transceiver, a second control circuit, an indicator electrically coupled to the second control circuit, and a latch mechanism. The tool can be configured to interact with the latch mechanism to securely couple the beacon to an object, for example, to lock the beacon on a handle of a stroller.

BRIEF DESCRIPTION OF THE SEVERAL VIEWS OF THE DRAWINGS

For a better understanding of the present disclosure, preferred embodiments are now described, purely by way of non-limiting examples and with reference to the drawings, wherein.

DETAILED DESCRIPTION

Figure 1:
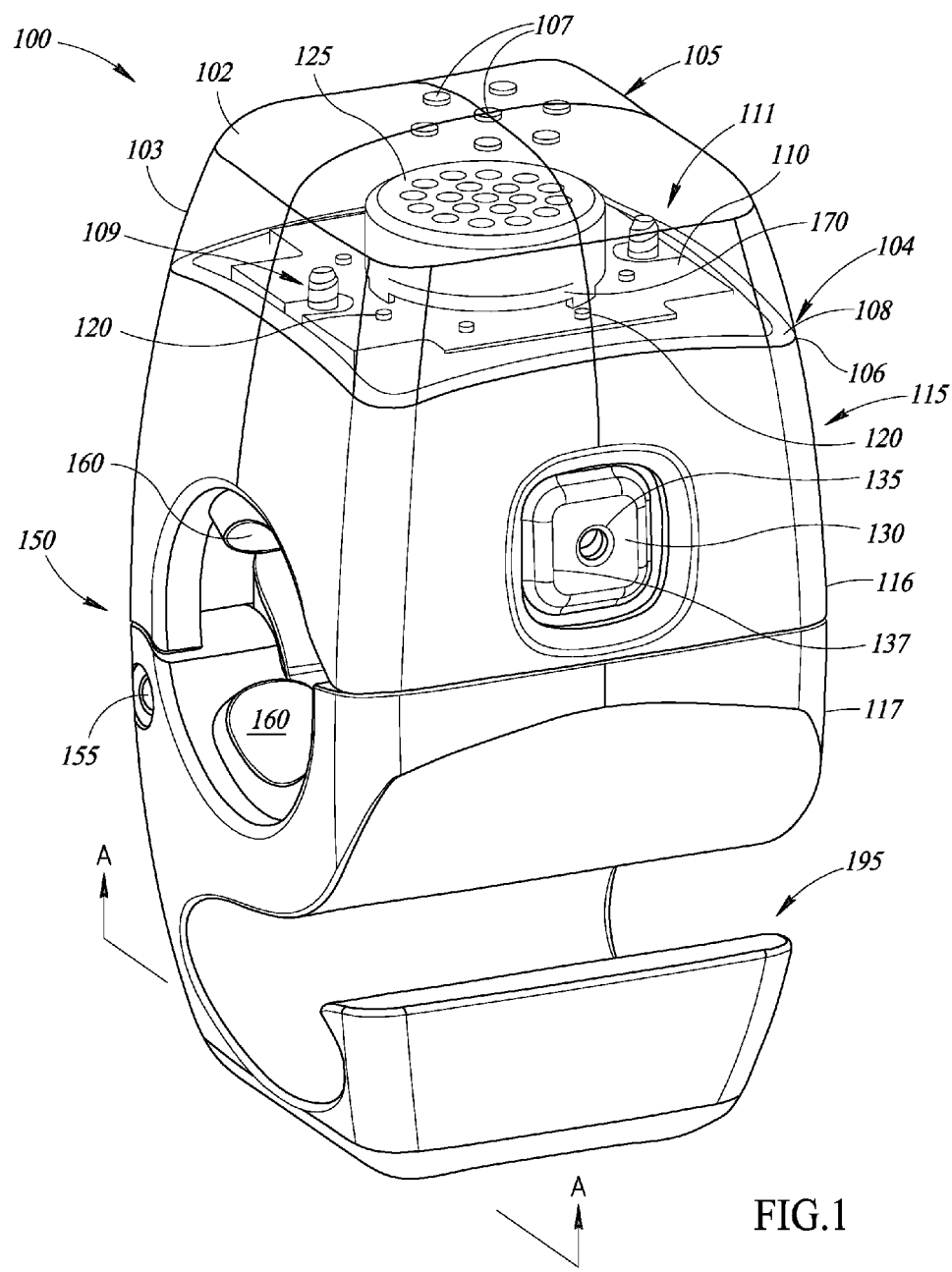
FIG. 1 shows an isometric view of a beacon.

The present disclosure is directed to providing a system for locating objects in crowded environments. The system includes a beacon. One embodiment of a beacon, designated by 100, made according to the teachings contained in this disclosure, is shown in FIG. 1. The illustrated beacon 100 is configured to be attached to an object and activated by a remote 800 (see FIGS. 8a, 8b).

The illustrated beacon 100 is comprised of a housing or body 115 which is further comprised of a lens 105, an aperture 150, a hinge 155, and a hook 195. The body 115 provides the physical structure of the beacon 100 in or onto which the other features of the beacon 100 are located.

One function of the beacon 100 is to attract attention to itself. The beacon 100 uses indicators, such as indicators 125 and 120, for the purpose of attracting attention to itself. The beacon 100 may use one of more indicators of one or more types. In particular, the illustrated beacon 100 includes the indicator 125, which may be an auditory indicator, such as a speaker or a buzzer. The other indicators 120 may be light emitting indicators, such as LEDs or light bulbs. The auditory indicators may play a pre-selected song or audible alarm. Alternatively, in some embodiments, the auditory indicators may be programmed by the user to play a selected song or sound. Programming a specific sound allows the user to personalize the audible indicator, which in turn may make it more easily identifiable in a crowd. Similarly, the visual indicator may be programmed to flash in a pre-selected pattern set by the manufacturer or may be programmed by the user to flash in a user-selected pattern.

The indicators 125 and 120 may be housed beneath the lens 105. The lens 105 may be clear or opaque and facilitates the diffusion or disbursement of the light emitted from the light emitting indicators 120. Also, because the beacon 100 may be used to locate objects that are used or stored outside and therefore potentially subject to inclement weather, the lens may also provide weather protection or shielding for the indicators 120 and 125 and for other components such as a beacon electrical control circuit 170. The lens 105 may be affixed to the body 115 in any suitable manner and may include weather sealing 106 at a lens joint 104, particularly on the mating surface 108 of the lens 105 and any corresponding mating surface of the beacon 100. The lens 105 may also be connected to the body 115 or other portion of the beacon 100 by ultrasonically welding the lens joint 104 to a corresponding portion of the beacon 100.

The lens 105 may be removably coupled to the body 115 such that it may be removed and access gained to components of the beacon 100, such as the indicators 120 and 125, the beacon control circuit 170, and a circuit board 110. By removing the lens and gaining access to the components of the beacon 100, the components may be replaced, for example, in the case when components are damaged or when they are upgraded.

The lens 105 may also have portions that facilitate the propagation of sound, such as thin sections 107. The thin sections 107 of the lens 105 provide less resistance to the transmission and propagation of sound. If the indicator 125 is a speaker, the thin sections 107 may allow sound to be more easily heard by the operator of the beacon 100. In other embodiments, the thin sections 107 may be apertures or perforations through the lens 105 that provide for even less resistance to the transmission and propagation of sound.

The indicator 125 may be mechanically or electrically coupled to the beacon control circuit 170. The beacon control circuit 170 maybe comprised of a microcontroller, a wireless transceiver, an antenna, a power supply, a charging circuit, and conditioning circuits (see FIG. 7, below). The indicator 125, the beacon control circuit 170, LEDs 120, and other electrical devices may be coupled to a circuit board 110 which may in turn be coupled to the lens 105, the body 115, or other parts of the beacon 100.

In the illustrated embodiment, when viewing the lens 105 from a top, the lens 105 has a generally square shape that corresponds to the generally square shape of the body 115. The lens 105 includes a top surface 102 that couples to side surfaces 103. Both the top and side surfaces 102, 103, are transparent; however, in other embodiments, the side surfaces 103 may be opaque or solid, such that the light does not pass through the side surfaces. In other embodiments, the lens may only be a top surface 102 such that the lens is a planar element that fits into the body 115.

The body 115 may include a peg 109 that extends from a top surface 111 of the body 115. The lens 105 may be configured to receive the peg 109 to couple the lens to the body.

The body 115 of the beacon 100 may be further comprised of an upper body 116 and a lower body 117. The upper body 116 and lower body 117 may be coupled together, for example, by a hinge 155. The hinge 155, upper body 116, and lower body 117 may be configured such that the upper body 116 and lower body 117 may open and close, see FIG. 3 which depicts the beacon 100 in an open position. In a closed position, as depicted in FIG. 1, the upper body 116 and lower body 117 of the beacon 100 also define an aperture 150.

Figure 3:
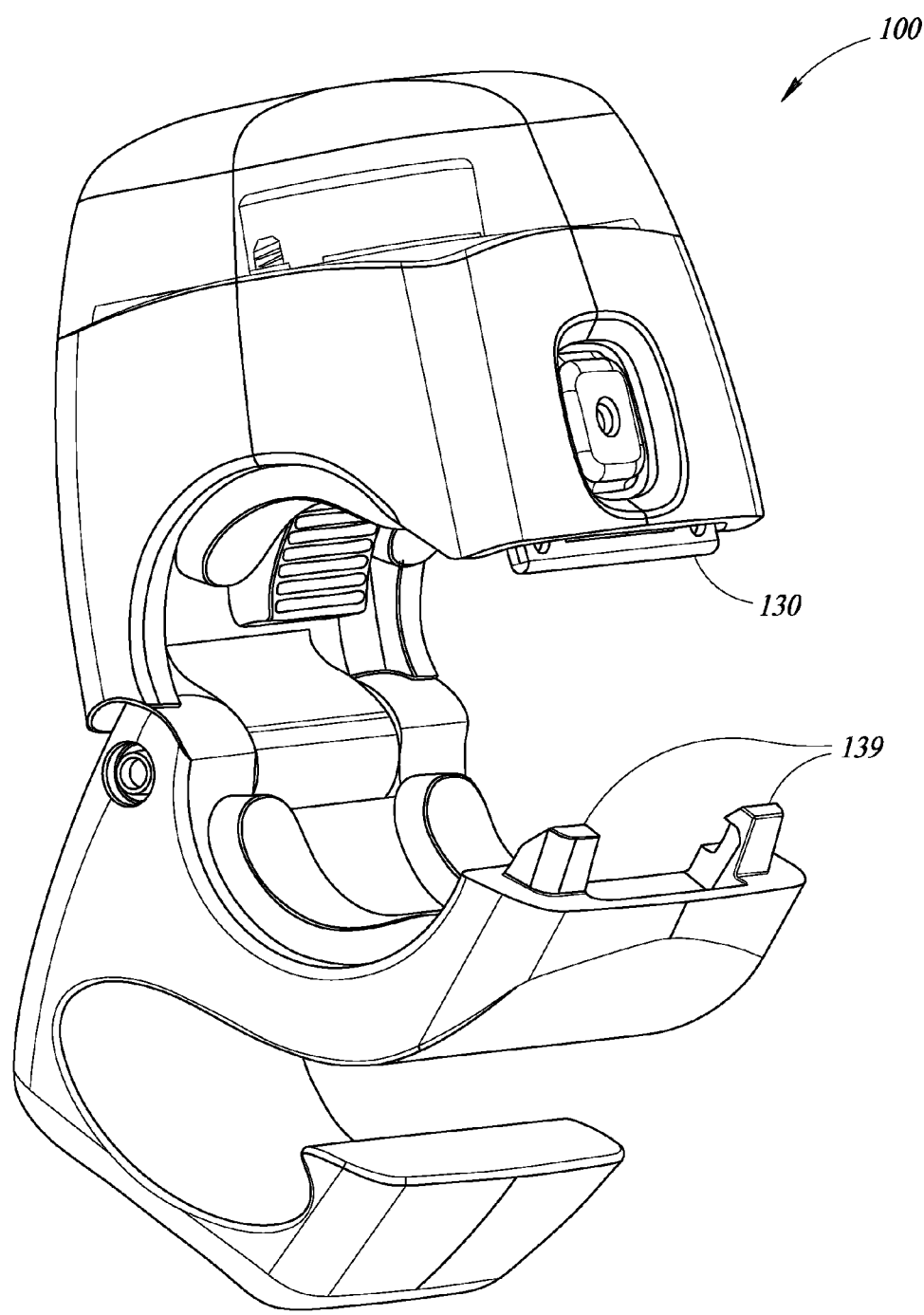
FIG. 3 shows the beacon of FIG. 1 in an unlocked and open configuration.

The aperture 150 facilitates coupling the beacon 100 to an object, for example a bar of a stroller or bicycle. To couple the beacon to a bar, for example, with the beacon 100 in an open position, such as shown in FIG. 3, the user may place the beacon 100 in a position such that the bar may pass through the open aperture 150. With the bar passing through the open aperture 150, a user may then close the upper body 116 and lower body 117 together such that the aperture 150 at least partially surrounds the bar.

Discussed in more detail later, a latching mechanism 130 may be configured to facilitate the closure of the upper body 116 and lower body 117. The latching mechanism 130 may include a button 137 configured such that a user may interact with the button 137 to facilitate the engagement and disengagement of the latching mechanism 130. When the latching mechanism 130 is engaged, it may couple together the upper body 116 and lower body 117 of the beacon 100 in a closed position, as depicted in FIG. 1. When disengaged, the latching mechanism 130 may facilitate opening the beacon 100 to an open position as depicted in FIG. 3.

The latching mechanism 130 may also have an access hole 135. Access hole 135 provides access to a locking mechanism 145. The locking mechanism may be configured such that it may hinder interaction with the button 137 and thus may prevent unauthorized unlatching of the latching mechanism 130 and decoupling of the upper body 116 and lower body 117.

To facilitate attaching the beacon 100 to objects of differing diameter, the beacon 100 may include pads 160 which may be located on the interior of the aperture 150. For example, as shown in the embodiment of FIG. 1, pads may be coupled to the upper body 116 and lower body 117 at an interior of the aperture 150 and, by occupying space in the aperture 150, reduce the working diameter of the aperture 150 and thereby facilitate attaching the beacon to a smaller object, such as a small diameter bar.

The pads 160 may be of a more rigid material such that when added to the interior of the aperture 150, the working diameter of the aperture 150 is changed so that it may fit a bar or another object of a particular size and shape. In other embodiments, the pads 160 may be less rigid, for example, they may be comprised of a compressible material, such as a foam or rubber compound, that allows the aperture 150 to take on at least part of the shape of the object to which the beacon 100 is attached. In addition, the pads may be configured to be adjusted to securely attach the beacon to an object.

The beacon 100 may also be outfitted with additional structure that may provide secondary functionality, such as a hanger or a hook. The beacon 100 of FIG. 1 includes a hanger 195 from which a user may hang additional items, such as a diaper bag, grocery bag, umbrella, or purse.

Figure 2:
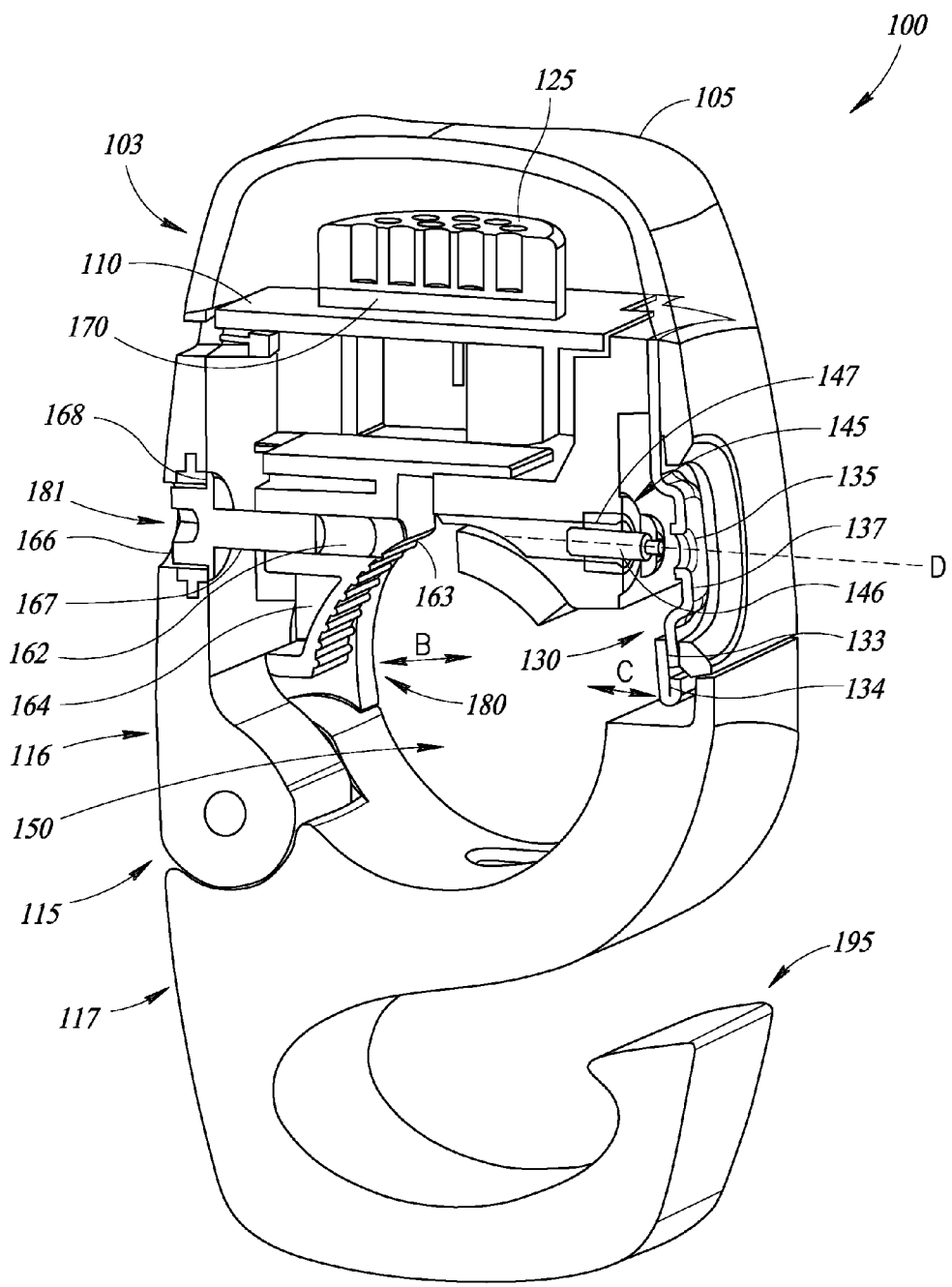
FIG. 2 shows a section view along A-A of the beacon of FIG. 1.

FIG. 2 shows a section drawing of the beacon 100 of FIG. 1 along the section A-A. The beacon 100 may include a clamp, such as a clamp mechanism 180, that is configured to clamp the beacon 100 to an object to which the beacon 100 is attached. The clamp mechanism 180 acts to resist movement of the beacon 100 such that it may maintain a desired orientation. For example, a user may wish to have the light emitting indicators 120 in a particular orientation such that they are most visible when trying to locate the beacon 100. In order to resist movement, the clamp mechanism 180 moves a clamp body 164 toward a center of the aperture 150. As the clamp body 164 moves towards the center, the clamp body 164 moves towards the object onto which the beacon is attached.

The clamp mechanism 180 may be comprised of the clamp body 164 and a clamp screw 166, accessible from the outside of the body 115. The clamp screw 166 may be comprised of a screw head 181 and a threaded shaft 167. The screw head 181 may include a retention structure 168 that is configured to retain or rotatably couple the clamp screw 166 to the body 115. The threads of the threaded shaft 167 engage with the threads of the threaded hole 162 which is located in the clamp body 164. By rotating the clamp screw 166 in one direction or the other, the clamp body 164 may be translated back and forth along direction B.

When the clamp body 164 is translated along direction B in a direction towards the right in FIG. 2, the clamp surface 163 may be forced against an object in the aperture 150 to which the beacon 100 is attached, such as a bar. By forcing the clamp surface 163 of the clamp body 164 against an object, friction between the beacon 100 and the object may be increased and the beacon 100 may resist movement such that the beacon 100 may maintain an orientation. The clamp surface 163 may be comprised of ridges and valleys or other surface details that may serve to alter the friction between the beacon 100 and the object such that the clamping mechanism 180 increases or decreases the beacon's 100 ability to resist movement and maintain an orientation.

Figure 4:
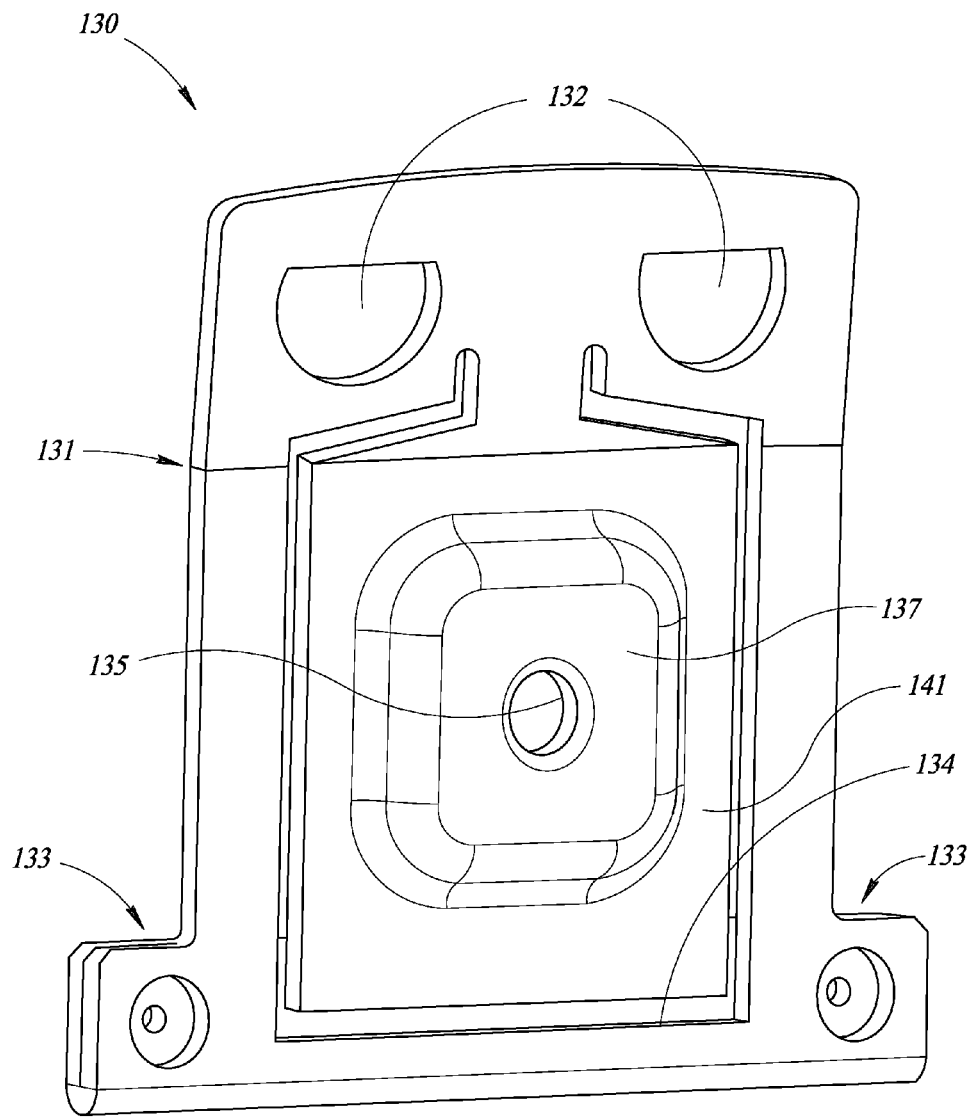
FIG. 4 shows a component of a latch of the beacon of FIG. 1.

FIGS. 2, 3, and 4 depict the latch mechanism 130. As shown in FIG. 4, the latch mechanism 130 may be comprised of the latch body 131, which includes a mounting structure 132, a button 137, an access hole 135, latch tabs 133, a latch bar 134, and a latch locking mechanism 145. The latch mechanism 130 may include mounting structure 132 that facilitates mounting the latch mechanism to the beacon 100. For example, if the body 115 is formed through an injection molding process, mounting structure 132 may be apertures, as depicted in FIG. 4, that allow injection molded material to flow into the mounting structure 132, and, once cured or hardened, the molded material may retain the latch body 131 and couple it to the beacon body 115.

The latch mechanism 130 may also include a latch button 137 and a latch button plate 141. The latch button 137 and latch button plate 141 may be configured such that when the latch button 137 is pushed towards the interior of the body 115, a surface of the button plate 141 may interact with a surface of the latch bar 134 and may cause the latch bar 141 to move in direction C, as shown in FIG. 2, or in any other direction that facilitates operation of the latch mechanism 130.

When the latch is in a closed and latched position, as depicted, for example, in FIGS. 1 and 2, the latch tabs 133 may be engaged by the latch hooks 139 (see FIG. 3). When the latch tabs 133 are engaged by the latch hooks 139, the latch mechanism facilitates keeping the beacon body 115 in a closed position and resists opening of the latch body 115. But, when the latch button 137 is pushed towards the interior of the body 115, it may interact with a surface of the latch bar 134 and cause the latch bar 141 to move in a direction, such as in direction C shown in FIG. 2, and disengage the latch tabs 133 from the latch hooks 139, which may allow the body 115 to be configured in an open position, for example, as shown in FIG. 3.

Going back to FIG. 2, a cutaway of the latch locking mechanism 145 is shown. A latch locking mechanism is configured to resist the movement of latch mechanism such that the latch mechanism may be kept in a closed and latched position. For example, the latch locking mechanism 145 is comprised of a locking bolt 146 that may be engaged with the locking bolt shaft 147 and when the locking bolt 146 is rotated, the bolt may translate along direction D. In the embodiment depicted in FIG. 2, a tool, such as a tool 850 as depicted in FIG. 8 and described elsewhere in this disclosure, may interact with the latch mechanism 145 by being inserted through the latch access hole 135 and engage with and rotate the locking bolt 146 such that the locking bolt translates along direction D towards the latch button 137 until the locking bolt 146 is in a position such that it resists movement of the latch button 137. When the locking bolt 146 resists or prevents movement of the latch button 137, a surface of the button plate 141 may be prevented from interacting with a surface of the latch bar 134 and, therefore, may prevent the latch bar 134 from moving. If the latch bar 134 may not move, the latch tabs 133 may remain engaged with the latch hooks 139, and the body 115 remains in a closed and latched position and the beacon 110 remains attached to an object.

Figure 5A:
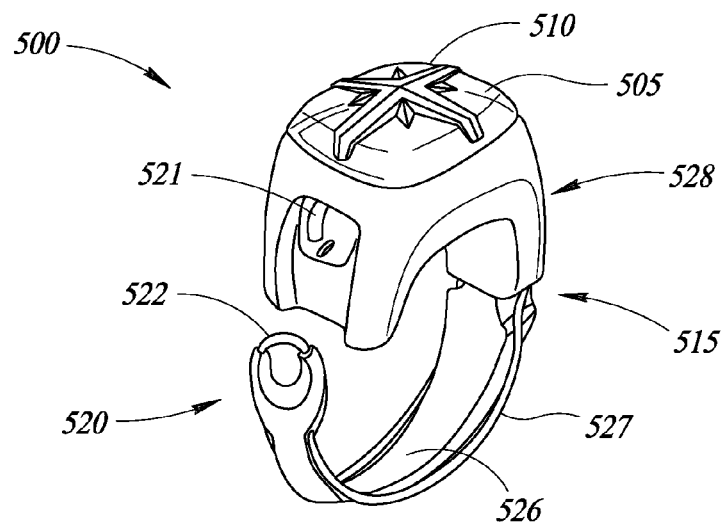
FIGS. 5a-5c show additional embodiments of beacons with different latching systems according to alternative embodiments of the present disclosure.
Figure 5B:
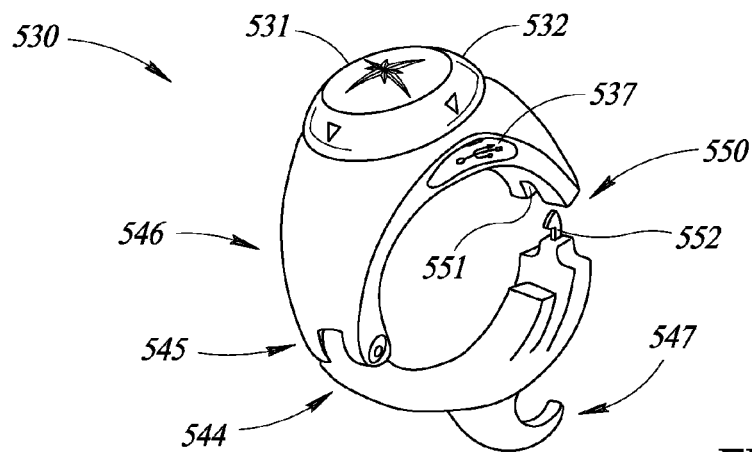
Figure 5C:
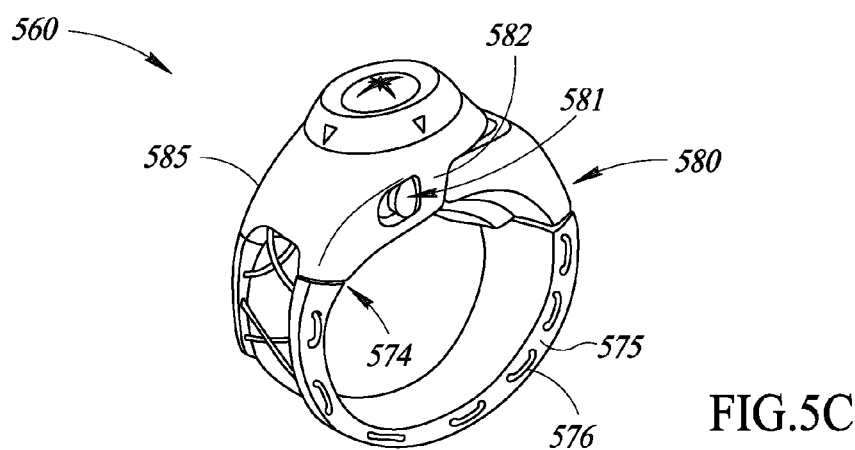

FIGS. 5a, 5b, and 5c show additional alternative embodiments of beacons with different latching systems and different lens designs. The lens shapes may include an aesthetic design and can be in a variety of shapes and colors and can have a variety of patterns formed on the top surface.

The beacon 500, shown in FIG. 5a, is comprised of a lens 510, indicators 505, a control circuit (not shown), and an upper body 528 coupled by a hinge 515 to a lower body 526. The lower body 526 includes a cable 527 for additional security and strength. The beacon 500 also includes a latching mechanism 520 that is configured to releasably attach the beacon 500 to an object. The latching mechanism 520 is comprised of a retractable hook 521 that is configured to engage with a hoop 522. The hoop 522 may be formed by a bend in the cable 527. In some embodiments, the cable 527 and hoop 522 may be co-molded into the lower body 526. When in a latched position (not shown) the retractable hook 521 engages with the hoop 522 such that disengagement of the hoop 522 is resisted and the beacon 500 may remain attached to an object. When the latching mechanism 520 is engaged, it may couple together the upper body 528 and lower body 526 of the beacon 500 in a closed position. When the latching mechanism 520 is disengaged, the latching mechanism 520 may facilitate opening the beacon 500 to an open position as depicted in FIG. 5a.

The cable 527 may be configured to be used as a tightening mechanism to securely attach the beacon to an object. In addition, the lower body 526 may include pads or other features to assist in securely attaching the beacon to an object. In one embodiment, the lower body 526 may be a rigid element; however, in other embodiments the lower body 526 may be an elastic, flexible feature that is resilient. The flexible feature could be resistant to tearing and resistant to easy separation from the upper body 528 for security purposes. For example, the flexible feature could be a reinforced rubber that would be difficult to cut, but that is reasonably compliant for easy manipulation around the object.

This beacon 530 may be remotely activated by the remote 800 when the object to which it is attached is out of sight or in a crowded area. Some embodiments will include only LEDs or other illumination indicators, while other embodiments will include only a speaker or other audio indicators.

The beacon 530, shown in FIG. 5b, is comprised of an upper body 546 coupled by a hinge 545 to a lower body 544. The beacon 530 also includes a latching mechanism 550 that is configured to releasably attach the beacon 530 to an object. The latching mechanism 550 is comprised of a latch hook 552 that is configured to engage with the latch tab 551 and couple the lower body 544 to the upper body 546. When the latching mechanism 550 is disengaged, as shown in FIG. 5b, the latching mechanism 550 may facilitate opening the beacon 530 to an open position. When the latching mechanism 550 is in an engaged position (not shown) it may couple the upper body 546 with the lower body 544 and facilitate attaching the beacon 530 to an object.

The beacon 530 may also include a communication port 537 that is coupled to a control circuit (not shown). The communication port 537 may be configured to facilitate making changes to or communicating with the control circuit of the beacon 500. For example, the communication port 537 may be a USB port, a mini USB port, or another serial or parallel port that allows the user to program the control circuit with a selected light or sound pattern. This communication port 537 may also provide a way to charge a power source included in the beacon.

The lens of the beacon 530 has a generally circular or oval shape when viewed from above. The curved shape has a top surface 531 that is smaller in diameter than a portion of the upper body 546 onto which the lens attaches. Sidewalls 532 of the lens extend from the top surface to the portion of the body and have a gradually wider diameter as the sidewalls get further away from the top surface 531.

The beacon 530 may include a hook 547 formed on an underside of the lower body 544. The hook 547 may be configured to hold a bag, a jacket, or other item when the beacon is attached to an object, e.g. a stroller.

The beacon 560, shown in FIG. 5c, is comprised of an upper body 585 coupled by a hinge 574 to a lower body 575. The beacon 560 also includes a latching mechanism 580 that is configured to releasably attach the beacon 560 to an object. The latching mechanism 580 is comprised of a latch hook 582 that is configured to engage with the latch tab 581 and couple the lower body 575 to the upper body 585. When the latching mechanism 580 is in a disengaged position (not shown) the latching mechanism 550 may facilitate opening the beacon 530 to an open position (not shown). When the latching mechanism 550 is in an engaged position, as shown in FIG. 5c, it may couple the upper body 585 with the lower body 575 and facilitate attaching the beacon 560 to an object.

The beacon 560 may also include a cable 576 at least partially coupled to the upper body 585 and lower body 575. In some embodiments, the cable 576 may be co-molded into the upper body 585 or lower body 575. The cable 576 provides increased resistance to unauthorized detachment of the beacon 560 from an object.

Figure 6:
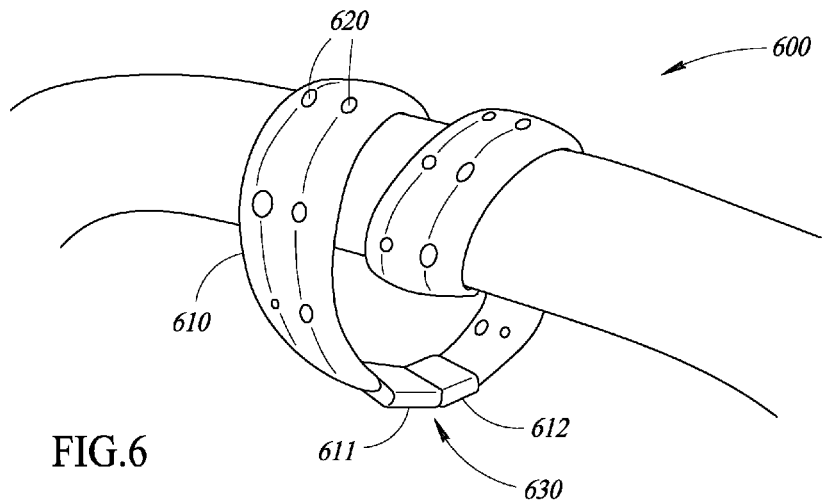
FIG. 6 shows a flexible beacon attached to a bar.

FIG. 6 shows an alternative embodiment of a beacon. The beacon 600 may have a flexible body 610 with opposite ends 611 and 612 and a latch mechanism 630 for coupling the ends 611 and 612. When in an unlatched configuration, the beacon 600 may be a thin and long strip. When the latch mechanism 630 is in a latched position, the ends 611 and 612 are coupled together and the beacon 600 forms a substantially continuous loop. In this way, the beacon 600 may be wrapped around the object to which it is attached.

The beacon 600 also includes indicators 620 that may be coupled to or co-molded into the body of the beacon 600 and electrically coupled to a control circuit (not shown) incorporated into the beacon 600. The control circuit, for example, may be incorporated into the latch mechanism 630 or other suitable part of the beacon 600.

The latch mechanism 630 of the beacon 600 may include a USB or mini USB port that is configured to receive information from a host system or computer to program and charge the beacon. As mentioned above, a visual light pattern may be programmed into the beacon to personalize the device.

Figure 7:
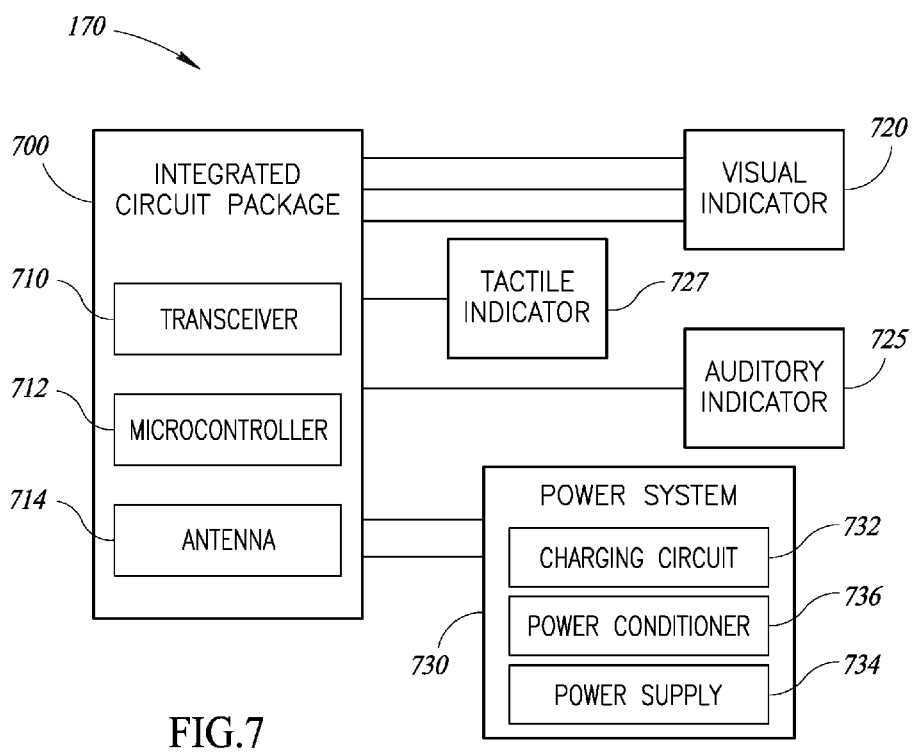
FIG. 7 shows a schematic block diagram of an electrical system for a beacon.

In some embodiments, the beacon may include a control circuit for controlling aspects of the beacon. FIG. 7 discloses one such beacon control circuit 170. In one embodiment the beacon control circuit 170 is comprised of a wireless transceiver 710, a microcontroller 712, and an antenna 714 contained within a single integrated circuit package 700. Alternatively, the transceiver, the microcontroller, and the antenna may be separate integrated circuit packages coupled to a printed circuit board.

The wireless transceiver 710 is configured to communicate with a wireless transceiver 1070 in the remote, (see FIG. 10), the microcontroller 712, and the antenna 714. The antenna 714 enhances the range of the communication between the transceiver 710 and the transceiver 1070 of the remote. In some embodiments, the transceiver 710 may also communicate with the user's mobile device to program the beacon's audio and visual patterns of indication.

The beacon control circuit 170 may be electrically coupled to indicators, such visual indicators 720, auditory indicators 725, and tactile indicators 727. For example, the visual indicators 720 may be light emitting diodes or other illumination device. The auditory indicators 725 may be speakers or other audible devices. The tactile indicators 727 may be vibratory indicators that cause the beacon to vibrate or shake.

The vibratory indicator may be utilized as a communication device between an adult and an older child. For example, when entering a theme park where the child may separate from the adult for some time, they may establish a meeting spot in case of emergency, with the vibration of the beacon being an indicator to meet at the meeting spot. The vibration of the beacon may be sufficient for informing the child, while not embarrassing the child with loud noises and lights that are out of their control.

The control circuit 170 may control attributes and features of the indicators 720, 725, and 727 such as the intensity and color of the light emitting indicators 720, the volume and tone of the audible indicators 725, or the frequency and amplitude of the vibratory indicator 727.

The control circuit 170 may have pre-programmed attribute and feature settings for the indicators 720, 725, and 727. This may allow the control circuit 170 to receive a selection of one or more of the pre-programmed settings at which to operate the indicators 720, 725, and 727. In other embodiments, the control circuit may not have pre-programmed attribute and feature settings for the indicators 720, 725, and 727, but may use attribute and feature settings it received from elsewhere, for example, from a remote or application as discussed below.

The control circuit 170 may also be coupled to a power system 730. The power system 730 may include a charging circuit 732, a power supply 734, and a power conditioner 736. The charging circuit may receive power from an external power supply 740, such as a standard AC to DC power supply that converts AC electricity from the electrical grid to DC electricity. The external power supply may also provide power through a Universal Serial Bus (USB) connection.

The power conditioner 736 may be configured to reduce the noise or variations in voltage sometimes generated in the AC to DC conversion process or otherwise transmitted to a beacon from the external power source 740.

The charging circuit 732 may be configured to recharge the internal power supply 734. The internal power supply 734 is configured to provide electrical power for the beacon, including power to operate the wireless transceiver 710, microcontroller 712, and indicators 720 and 725.

The internal power supply 734 may be a rechargeable or non-rechargeable battery of any known type. In a preferred embodiment, the internal power supply 734 is a lithium-polymer rechargeable battery.

Figure 8A:
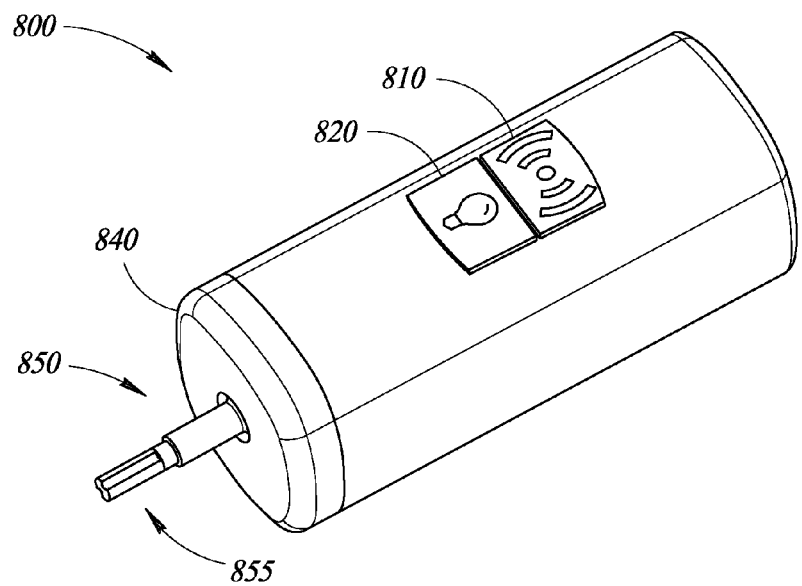
FIG. 8a shows a remote with a retractable sleeve in a retracted position.
Figure 8B:
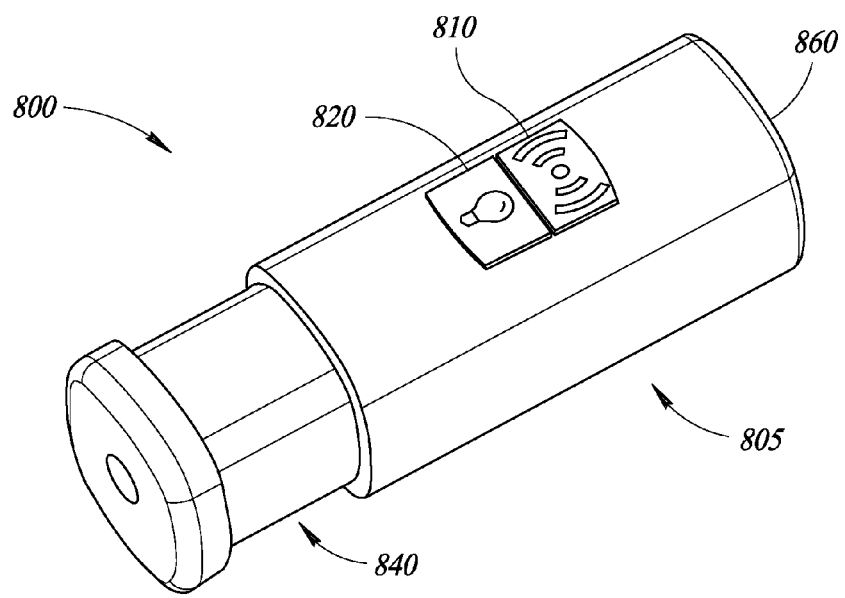
FIG. 8b shows the remote of FIG. 8a with the retractable sleeve in an extended position.

FIGS. 8*a* and 8*b* show an embodiment of a remote 800. The remote 800 may be configured to communicate with a beacon, such as the beacon 100. The remote 800 may have three main functions: to activate the indicators of a beacon and therefore facilitate locating a beacon; to determine the remote's 800 proximity to a beacon; and to facilitate the engagement and disengagement of a latch mechanism of a beacon and therefore to facilitate attaching a beacon to and detaching a beacon from an object.

FIG. 8*a* shows a remote 800 with a retractable shroud or sleeve 840. The retractable shroud 840 is shown in a retracted position and the tool 850 is exposed. The tool 850 may include a tool head 855 and extend from the body 805 of the remote 800 along a central axis of the remote 800, as shown in FIG. 8*a*. In other embodiments the tool 850 and tool head 855 may be configured to extend from the body in any manner that may facilitate the tool's 850 interaction with the latch mechanism 145; in particular, by being inserted through the latch access hole 135 and engaging with and rotating the locking bolt 146 such that the locking bolt 146 translates along a direction D towards the latch button 137 until the locking bolt 146 is in a position such that it resists movement of the latch button 137.

In some embodiments, the tool head 855 may be a hexalobular internal tool head which is commonly referred to as a Torx or star bit. In other embodiments the tool head may be a Security Torx, hex bit, flat head, or any other tool head that facilitate the operation of the latching mechanism as disclosed. Preferably, the tool head is a less commonly used tool design so that other people cannot easily remove and take the beacon from the object.

The remote may also include selection buttons, such as selection buttons 810 and 820. The selection buttons 810 and 820 may be electrically coupled to a control circuit included in the remote (for example, see the control circuit 1070 disclosed in FIG. 10). A light emitting indicator control button 820 may be configured such that it may cause the control circuit 1070 to communicate with a beacon and cause the beacon's light emitting indicators to activate. An audible indicator control button 810 may be configured such that it may cause the control circuit 1070 to communicate with a beacon and cause the beacon's audible indicators to activate. In this way, a user, by pressing or activating the selection buttons 810 or 820, may cause the indicators of a beacon to activate and may more easily locate the object they are looking for. The buttons also allow the user to deactivate the beacon as well so that the beacon is not blaring once the user has identified the object to which the beacon is attached.

FIG. 8*b* shows the remote with the retractable shroud 840 in an extended position. In the extended position, the retractable shroud 840 may protect the tool from damage and, by at least partially surrounding the tool 850, may help prevent the tool 850 from causing damage to other objects. For example, the remote 800 may be stored in a pocket or bag with other objects and by at least partially surrounding the tool 850, the retractable shroud 840 may prevent the tool from scratching, catching, or otherwise damaging other objects.

The remote may also have an attachment point 860 configured to facilitate attaching a strap, lanyard, or other device that may facilitate handling and keeping track of the remote. In other embodiments the attachment point 860, for example, may be a slot, ring, or magnet.

Figure 9:
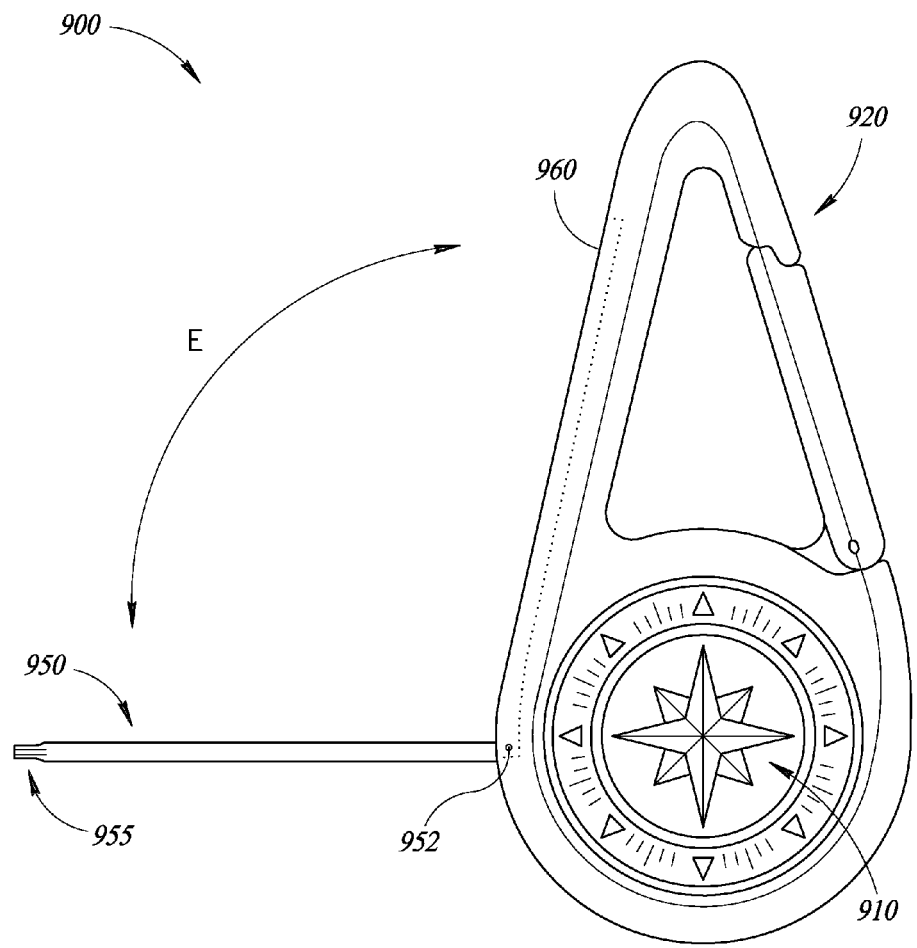
FIG. 9 shows an alternative embodiment of a remote with a retractable tool.

FIG. 9 discloses an alternative embodiment of a remote. The remote 900 is in the form of a spring-gate carabiner, characterized by the spring gate mechanism 920 that is configured to releasably attach the remote to an object such as a key ring, belt loop, or bag strap.

The remote 900 includes a moveable tool 950. The tool 950 includes a tool head 955. The tool 950 is configured such that it may facilitate the tool's 950 interaction with the latch mechanism 145; in particular, by being inserted through the latch access hole 135 and engaging with and rotating the locking bolt 146 such that the locking bolt 146 translates along a direction D towards the latch button 137 until the locking bolt 146 is in a position such that it resists movement of the latch button 137.

The remote 900 includes a shroud or groove 960. In the embodiment disclosed in FIG. 9, the shroud 960 of the remote 900 may be a slot (represented by a dashed line). The shroud 960 is configured to at least partially surround the tool 950. The tool 950 may be configured such that it is rotatable around an axis 952 in direction E. When the tool 950 is in an open position, such as depicted in FIG. 9, the tool 950 may interact with a latching mechanism. When the tool 950 is in a closed position, for example when at least partially surrounded by shroud 960, the other objects may be protected from damage by the tool 950.

In the embodiment of FIG. 9, the remote 900 includes a five-way selection button 910, sometimes referred to as a five-way switch or five-way controller. The five-way selection button 910 is configured to permit five different pressing operations: up, down, left, right, and center. The five-way selection button 910 may be electrically coupled to a control circuit included in the remote (for example, see the control circuit 1070 disclosed in FIG. 10). In some embodiments, by pressing the five-way selection button 910 to the right, for example, the five-way selection button 910 may be configured such that it may cause the control circuit 1070 to communicate with a beacon and cause the beacon's light emitting indicators to activate. By pressing the five-way selection button 910 to the left, for example, the five-way selection button 910 may be configured such that it may cause the control circuit 1070 to communicate with a beacon and cause the beacon's audible indicators to activate. In this way, a user, by pressing or activating the five-way selection button may cause the indicators of a beacon to activate and may more easily locate the object they are looking for.

Figure 10:
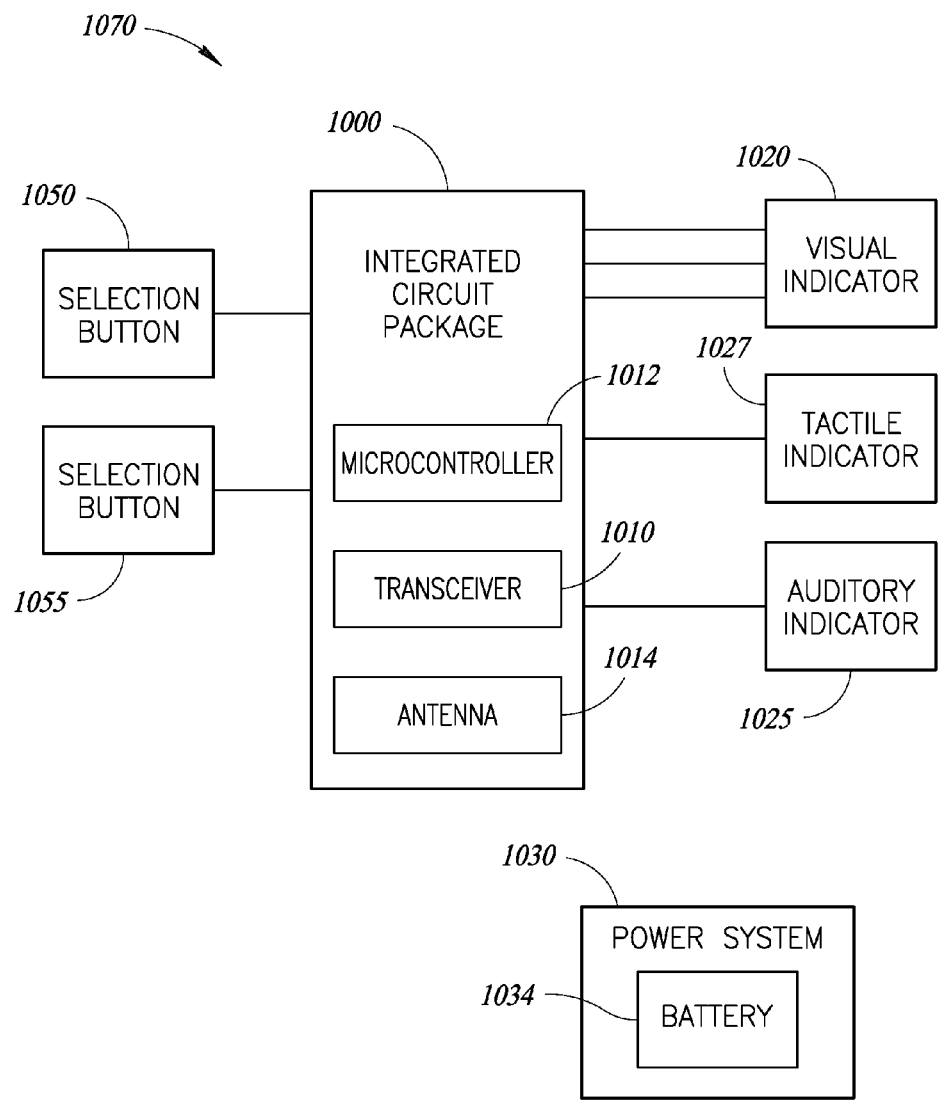
FIG. 10 shows a schematic block diagram of an electrical system for a remote.

The remote may include a control circuit for controlling aspects of the remote and for communicating with a beacon. FIG. 10 discloses one such remote control circuit 1070. In one embodiment, the remote control circuit 1070 is comprised of a wireless transceiver 1010, a microcontroller 1012, and an antenna 1014 contained within a single integrated circuit package 1000.

The remote wireless transceiver 1010 is configured to communicate with a remote control wireless transceiver 170 (see FIG. 7) and may be electrically coupled to a microcontroller 1012 and an antenna 1014. In some embodiments, the wireless transceiver 1010 and microcontroller 1012 are two parts of the same integrated circuit.

The control circuit 1070 may be electrically coupled to indicators, such as indicators 1020, 1025, and 1027. The indicators 1020, 1025, and 1027 may be one or more light emitting, auditory, or vibratory indicators, respectively. The control circuit 1070 may control attributes and features of the indicators 1020, 1025, 1027 such as the intensity and color of the light emitting indicators 1020, the volume and tone of the audible indicators 1025, and the frequency and amplitude of the vibratory indicator 1027.

The control circuit 1070 may have pre-programmed attribute and feature settings for the indicators 1020, 1025, 1027 and may receive a selection of one or more of the pre-programmed settings at which to operate the indicators 1020, 1025, 1027 through, for example, the wireless transceiver 1010. In other embodiments, the remote control circuit 1070 may not have pre-programmed attribute and feature settings for the indicators 1020, 1025, and 1027, but may use attribute and feature settings it receives from elsewhere, for example, from another remote or application as discussed below.

The control circuit 1070 may also be coupled to a power system 1030. The power system 1030 may include a battery 1034. The battery 1034 may be a non-rechargeable coin type battery in some embodiments, while in other embodiments the battery 1034 may be a rechargeable lithium battery. In still other embodiments the battery 1034 may be a battery of any type that facilitates the remote's operation as disclosed.

A method of using a beacon, such as the beacon 100, and a remote, such as remote 800, in a preferred embodiment as a stroller-locating system is disclosed. The beacon 100 is configured in an open position, for example, as shown in FIG. 3, and then the open aperture 150 is placed around a bar of a stroller. The beacon 100 is then manipulated into a closed position, for example, as shown in FIGS. 1 and 2, around a bar of the stroller. The latch tabs 133 of the latch mechanism 130 engage with the latch hooks 139. In this way, the lower body 117 and the upper body 116 are coupled together around the bar of the stroller.

Next, the retractable shroud 840 is configured in a retracted position, for example, as shown in FIG. 8*a*, and the tool head 855 and the tool 850 are exposed. The tool 850 and in particular the tool head 855 are inserted through the latch access hole 135 and the tool engages the locking mechanism 145. The tool 850 may be rotated which may cause the locking bolt 146 to rotate and translate along direction D towards the latch button 137 until the locking bolt 146 is in a position such that it resists movement of the latch button 137. When the locking bolt 146 resists or prevents movement of the latch button 137, the surface of the button plate 141 is prevented from interacting with a surface of the latch bar 134 and, therefore, prevents the latch bar 134 from moving, the latch tabs 133 remain engaged with the latch hooks 139, and the body 115 remains in a closed and latched position, and thus the beacon 100 is now securely attached to the stroller.

The stroller may be left alone and the remote 800 may be carried around with a user and potentially the remote 800 may be moved a distance away from the beacon such that the transceiver 1010 in the remote 800 and the transceiver 710 in the beacon can no longer communicate with each other.

When the remote 800 is moved back within a range at which the transceiver 1010 in the remote 800 can again communicate with the transceiver 710 in the beacon 100, they two devices may begin communicating again. For example, the transceivers 1010 and 710 may operate according to the Bluetooth standard and may reestablish communication once the transceivers are within range of each other. In one embodiment, upon reestablishing communication with each other, the beacon indicators 120 and 125 may begin to emit light and sound, respectively, making the act of locating the stroller easier.

Once the stroller is located, the light emitting indicator control button 820 and auditory indicator control button 810 of the remote 800 may receive an input that causes the remote control circuit 1070 to communicate with the beacon control circuit 170 and causes the indicators 120 and 125 to turn off and stop emitting light and sound.

In another embodiment, the beacon indicators 120 and 125 do not begin emitting light and sound when the remote 800 and beacon 100 reestablish communication. Rather, after reestablishing communication between the beacon and the remote, the beacon waits to receive a message or messages from the remote 800. In such an embodiment, one or more of the control buttons 810 and 820 on the remote 800 may receive an input causing the remote control circuit 1070 to communicate with the beacon and causing the beacon to activate one or more of its indicators 120 and 125.

In still other embodiments, the remote control circuit 1070 may be configured to determine the relative distance between the beacon 100 and remote 800. For example, the remote may determine relative distance based on the strength of the communication signal the remote 800 is receiving from the beacon 100. In some embodiments, the remote control circuit 1070 may be configured with distance thresholds, for example, a near threshold, a medium threshold, and a far threshold. In such an embodiment, when the remote determines that the beacon is further away than the near threshold, but closer than the medium threshold, the remote may vibrate. When the remote determines that the beacon is further away than the medium threshold, but closer than the far threshold, the remote may vibrate and emit a sound. When the remote determines that the beacon is further away than the far threshold, but still in communication with the beacon, the remote may activate its light emitting, auditory, and vibratory indicators and may also send a message or signal to the beacon causing one or more of the beacon's indicators to activate.

In some embodiments, the remote may be an electronic key fob or a smart phone which may wirelessly communicate with the beacon, for example using Bluetooth technology. The remote may remotely activate the features of the beacon, such as the indicators and may configure the indicators on the beacon, for example to program illumination patterns in the light emitting indicators or program audible tones in the auditory indicators. The remote may also include programmable alert ranges or distances which may cause the indicators to active when the beacon and remote are within predetermined distances of each other.

Figure 11:
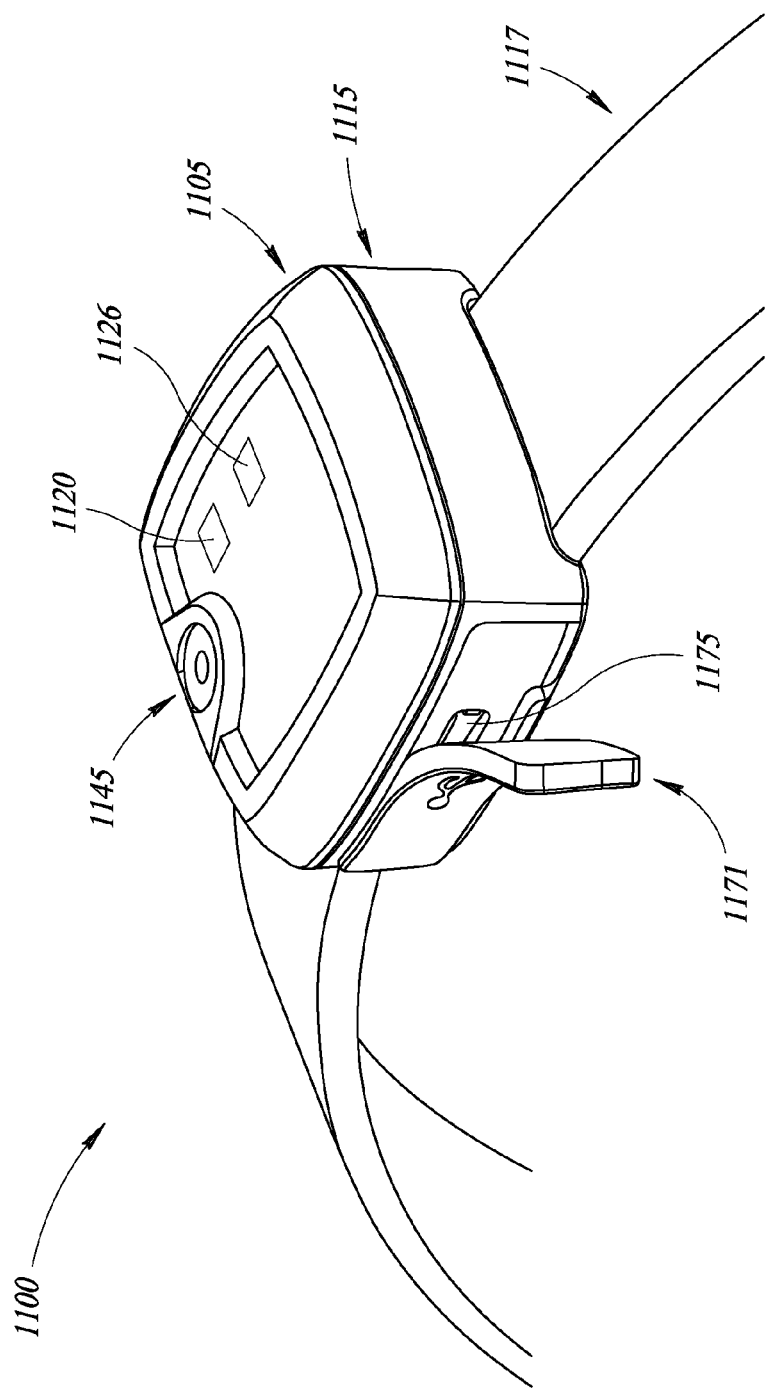
FIG. 11 shows an alternative embodiment of a beacon with a flexible strap.
Figure 12:
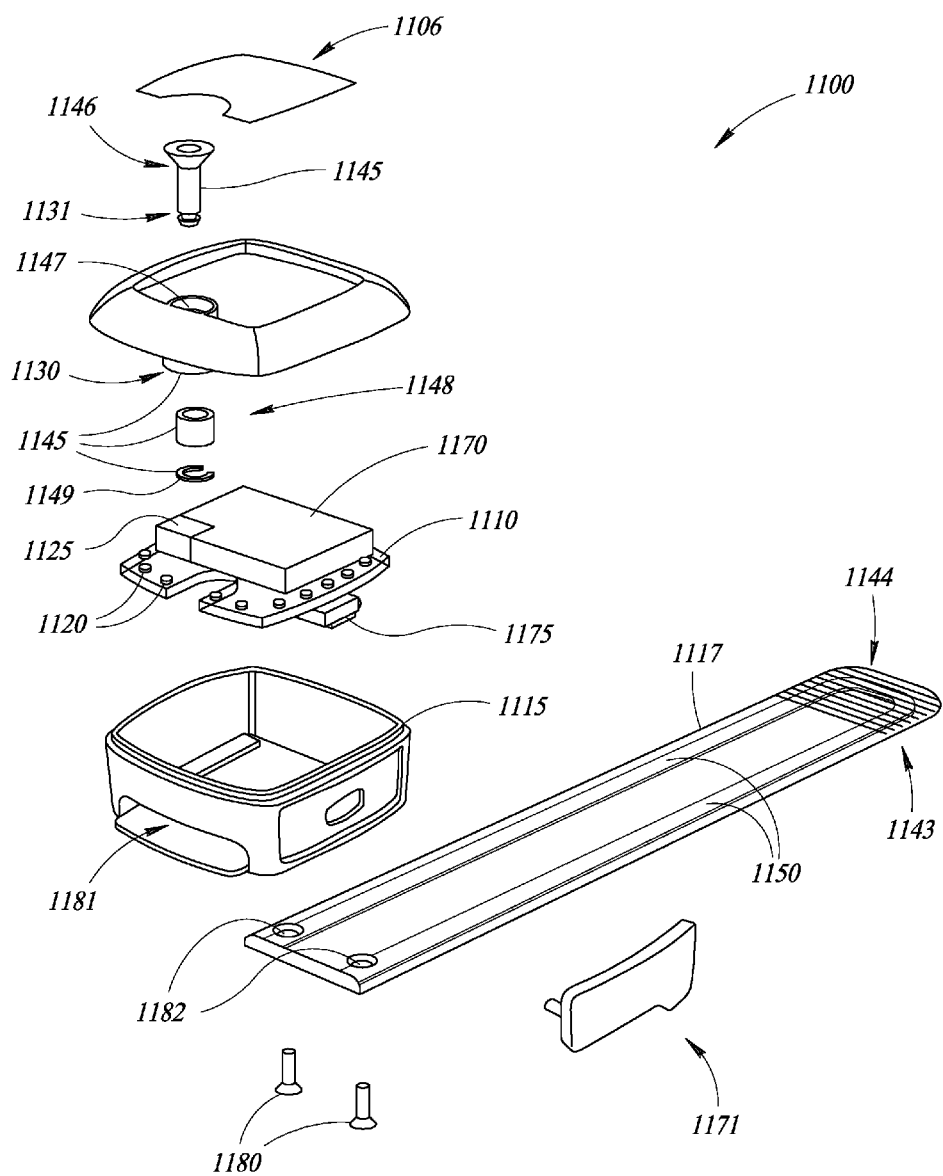
FIG. 12 shows an exploded view the beacon of FIG. 11.

FIGS. 11, 12, and 13 disclose another embodiment of a beacon. FIG. 11 discloses a beacon 1100 comprising a body 1115, to which other components of the beacon 1100 may be attached. The lens 1105 may be similar to the lens 105 of the beacon 100, discussed elsewhere in this disclosure, may be coupled to the body 1115, and may facilitate light and sound transmittal from the indicators 1120 and 1125 (see FIG. 12). The lens 105 includes an opening in the top surface that is closed with a lens cover 1106. The lens cover 1106 provides access to the indicators and circuitry in the body 1115 in case of repair.

While the embodiment of the beacon 100 is well suited for attachment to objects such as a bar or stroller handle that may be considered to have a rigid form of small diameter (for example, diameters between 0.5 inches and 1.5 inches), the embodiment of beacon 1100 includes a flexible strap 1117 for attachment of the beacon 1100 to larger and potentially less rigid objects, such as the wrist of a child. The beacon 1100 is much smaller than the beacons discussed above. The body 1115 has a generally square shape that is configured to be carried or worn without being too burdensome.

The beacon 1100 may also include a communication port 1175 that is electrically coupled to control circuit 1170 (see FIG. 12). The communication port 1175 may be a USB port or other input port for providing instructions to the circuitry within the beacon. The beacon may also include a weather seal or flap 1171 for inhibiting water and other objects from entering the internal portions of the beacon 1100. In particular, in some embodiments, the weather seal 1171 may be a molded rubber cover that is configured to cover and seal the communication port 1175 and thus inhibit water and other objects from damaging the communications port 1175.

FIG. 12 discloses a partially exploded view of the beacon 1100. Starting at the top of FIG. 12, the lens cover 1106 may be coupled to the lens 1105. The lens cover 1106 may provide a surface for branding or other indication. The lens cover seals the lens body to prevent water or dirt from entering the lens body, while also providing access to the components within the lens body.

The lens 1105 may be configured such that it may be coupled to the body 1115. The lens may include an aperture 1147 configured to accept the locking screw 1146 and may have an additional nut holder 1130 configured to accept a threaded nut 1148, which the locking screw 1146 may thread into. In other embodiments, the aperture 1147 may include internal threads into which the locking screw 1146 may be threaded, and a nut holder and threaded nut may not be necessary.

A retention ring 1149, also commonly called a c-clip, may be included. The retention ring 1149 is configured to attach to the locking screw 1146 at the retention channel 1131. Coupled to the locking screw 1146, the retention ring 1131 may prevent the locking screw 1146 from being completely unscrewed from the threaded nut 1148 and may prevent the locking screw from being removed from the beacon 1100.

The beacon 1100 may also include a control circuit 1170. The control circuit 1170 may be housed within the body 1115 of the beacon 1100 and may be substantially the similar to the control circuit 170 of FIGS. 1 and 7. The control circuit may be electrically coupled to a circuit board 1110, light and audible indicators 1120 and 1125, and a communication port 1175. In the embodiment of FIG. 12, the indicators 1120 and 1125 and the communication port 1175 may also be coupled to the circuit board 1175.

The beacon 1100 also includes a locking mechanism 1145 that may be configured to lock the strap 1117 and facilitate securely attaching the beacon 1100 to an object. The body 1115 may include a slot 1181 configured to accept the latching end 1143 of the strap 1117, as shown in FIG. 13 and described below. The strap may include a tamper sensor 1150. The tamper sensor 1150 may be a conductive strip, which may be embedded or co-molded into the strap 1117 and coupled to the control circuit by the strap screws 1180. The strap screws 1180 may be conductive and may be electrically coupled to the tamper sensor 1150 through strap apertures 1182 which may include electrically conductive contacts for the tamper sensor 1150. The strap screws 1180 may also be electrically coupled to the control circuit 1170, and the control circuit 1170 may be configured to determine when the strap 1117 is tampered with, for example, by a change in resistance of the tamper sensor 1150 or a loss of continuity in the tamper sensor 1150.

Figure 13A:
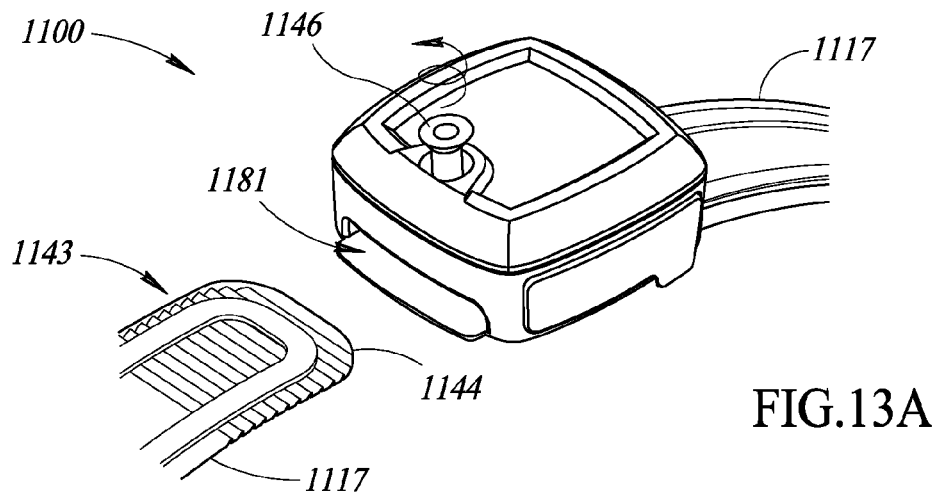
FIGS. 13a-13c show three steps for locking the strap of the beacon of FIG. 11.
Figure 13B:
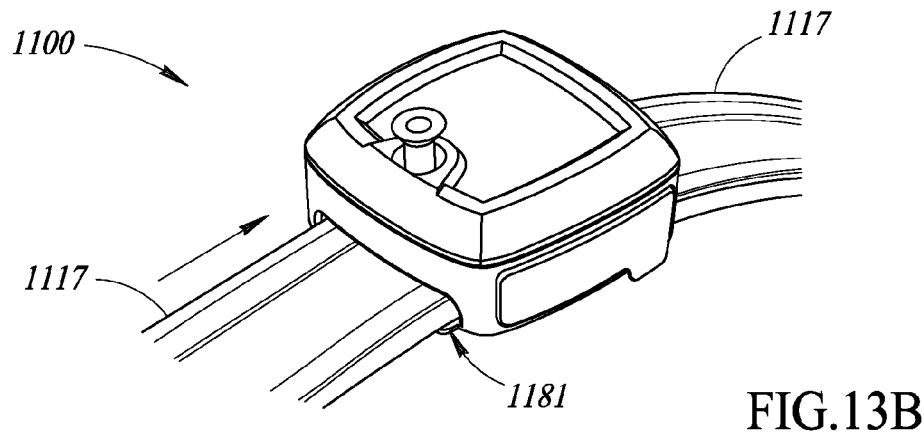
Figure 13C:
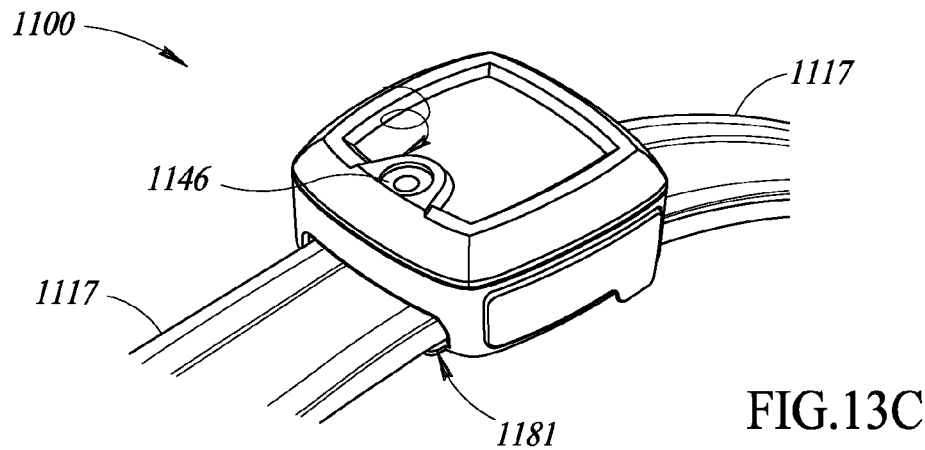

FIGS. 13*a*-13*c* disclose an example of how a beacon 1100 may be attached to an object and the strap 1117 may be locked. In FIG. 13*a*, the locking screw 1146 is unscrewed and in an open position and the beacon 1100 is configured to accept the latching end 1143 of the strap 1117 into the slot 1181.

The beacon 1100 may operate, communicate, and function with a remote, such as remote 800, in a manner substantially similar to the description given above with respect to the operation, function, and communication with and between the beacon 100 and the remote 800.

In other embodiments, a beacon may be configured to operate as both a beacon and a remote. For example, beacon 1100 may include selection buttons that may be coupled to the control circuit 1170 in a manner substantially similar to coupling of selection buttons 1050 and 1055 to the control circuit 1070 in the embodiment disclosed in FIGS. 8 and 10. In this way, for example, a child and a parent may both have a beacon 1100 attached to their wrists. Their respective beacons may be configured to communicate with each other. The child's beacon may be configured such that interaction with one of the child beacon selection buttons acts as a panic alarm and may cause the indicators of both the child and parent beacons to activate and emit light, sound, or vibrate. This would enable to child to alert their parent and the people around them of a problem.

In such an embodiment, a parent's beacon may be programmed such that when the parent interacts with the selection buttons on the parent beacon, the indicators on the child beacon are activated.

In FIG. 13*b*, the latching end 1143 of the strap 1117 is inserted into the slot 1181 of the body 1115. The locking ridges 1144 on the strap 1117 may be on a side of the strap 1117 facing the locking screw 1146. The strap 1117 may be adjusted to fit around objects of differing circumference by inserting more or less of the latching end 1143 into the slot 1181. In some embodiments, the strap 1117 may be removable such that straps of longer or shorter length may be coupled to the beacon 1100 and therefore enable the beacon 1100 to be attached to objects of any circumference.

In FIG. 13*b* the strap 1117 is locked and the beacon 1100 is securely attached to an object. The locking screw 1146 is screwed into the beacon 1100 and the end of the locking screw 1146 engages with the ridges 1144 of the latching end 1143 of the strap 1117, locking the strap 1117. In some embodiments, the screw may engage with a ridged clamp (not shown). The ridged clamp may have ridges that complement and engage with the ridges 1144 of the strap 1117. In such an embodiment, the locking screw 1146 is screwed in and presses the ridged clamp into the latching end 1143 of the strap 1117, the ridges of the ridged clamp (not shown) engage with the ridges 1144 of the latching end 1143 and resist removal of the strap 1117 from the body 1115 and facilitate securely attaching the beacon 1100 to an object.

Figure 14:
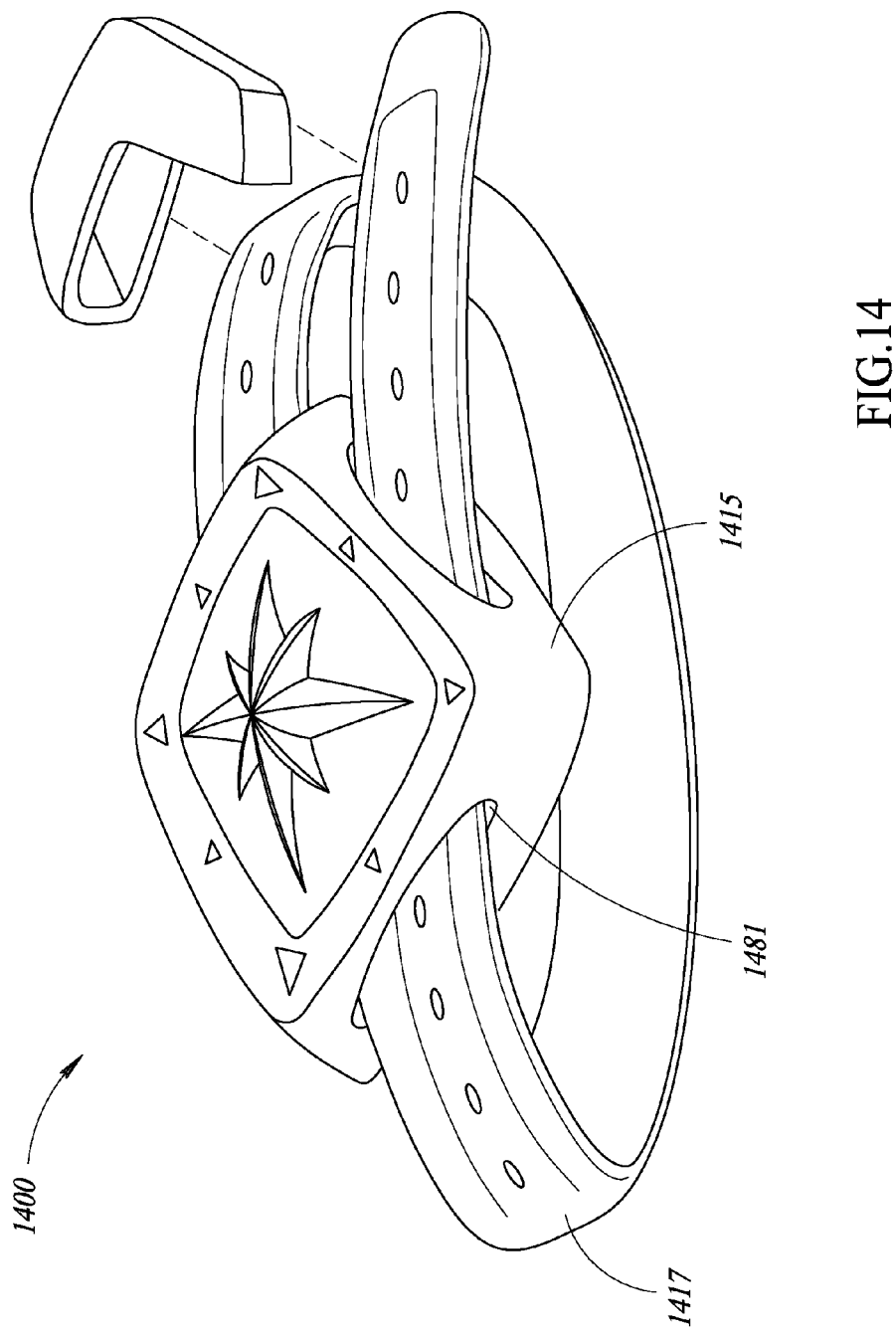
FIG. 14 shows an alternative embodiment of a beacon with a flexible strap.

FIG. 14 shows an additional embodiment of a beacon 1400 with a flexible strap 1417 and a body 1415. In this embodiment, the beacon 1400 is attached to an object by wrapping the strap 1417 around the object and passing the strap 1417 through a slot 1481 in the body 1415.

Figure 15:
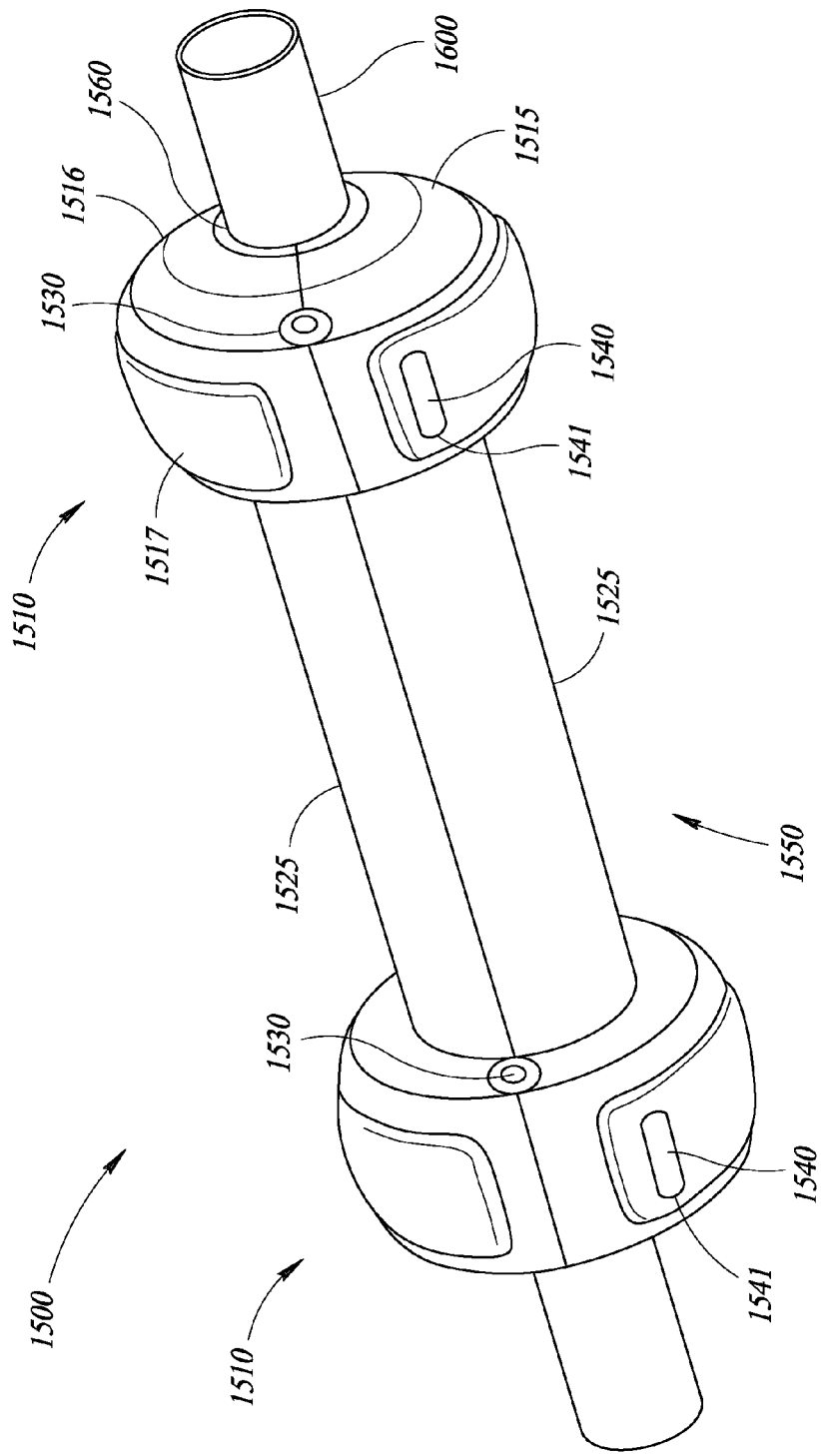
FIG. 15 shows an elongated beacon.

FIG. 15 discloses an embodiment of a beacon 1500. The beacon 1500 is elongated and configured to attach to a cylindrical object such as a bar 1600 which may be a bicycle tube or a portion of a mechanical or motorized scooter or kick scooter. The beacon 1500 is comprised of three main structural parts: two end caps 1510 and a connecting tube

1550. The connecting tube 1550 may be further comprised of a light emitting indicator 1525. The light emitting indicator 1525 may be comprised of electroluminescent strips. The beacon 1500 is configured such that when attached to an object, it may emit light and make locating the object to which is attached easier.

An end cap 1510 may be comprised of two halves, a first half 1515 and second half 1516 that may be pivotably coupled together with a hinge 1530. An end cap 1510 may also include a tension band 1517 that releasably couples the halves 1515 and 1516 together. The first half 1515 of an end cap 1510 may have one end of the tension band 1517 coupled to it such that it may not be easily removed from the first half 1515. The second half 1516 of an end cap 1510 may have an attachment structure 1540, such as a hook, configured to releasably engage with apertures 1541 at another end of the tension band 1517. In other embodiments, rather than a hook and aperture for releasably engaging the tension band 1517 with a half of an end cap 1510, the beacon 1500 may use snaps, hook and loops, or other releasable fasteners to releasably engage the tension band 1517 with a half of an end cap 1510.

Figure 16:
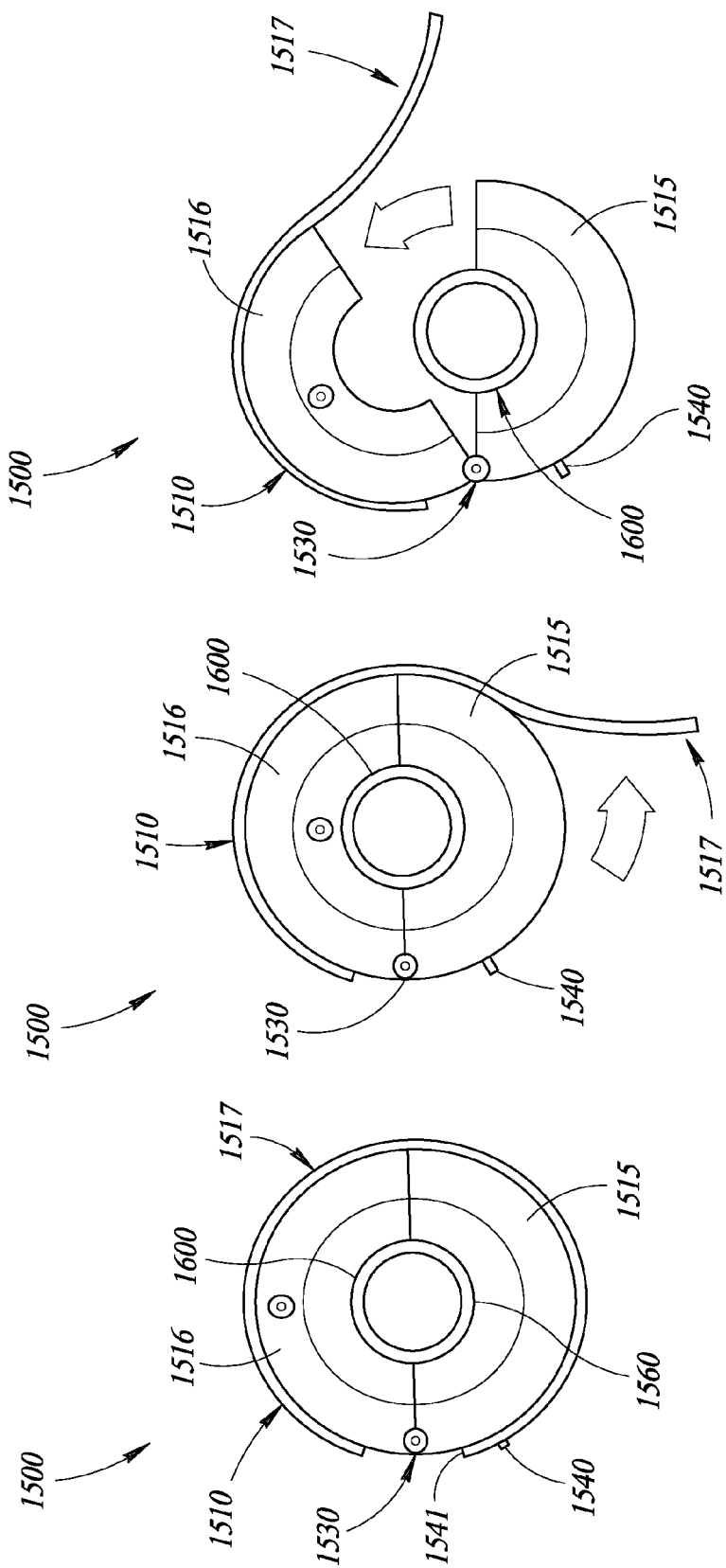
FIGS. 16a-16c show an end view of a latching operation of an embodiment of an elongated beacon with flexible latching straps.

FIG. 16 discloses an example of how a beacon 1500 may be attached to or detached from an object. In FIG. 16*a*, a beacon 1500 is attached to a bar 1600. The bar 1600 passes through an aperture 1560 that is formed by the interior surfaces of the two halves 1515 and 1516 of the end cap 1510. The tension band 1517 is wrapped around the two halves 1515 and 1516 of the end cap 1510 and an aperture 1541 in an end of the tension band 1517 is engaged with an attachment structure 1540. In this embodiment the attachment structure 1540 may be a hook.

FIG. 16*b* shows the aperture 1541 in an end of the tension band 1517 disengaged from the attachment structure 1540 and the tension band 1517 in an open position. When the tension band is in an open position the two halves 1515 and 1516 of the end cap 1510 may be rotated into an open position, for example, as shown in FIG. 16*c*, and the beacon 1500 may be detached from the bar 1600. To attached the beacon 1500 to the bar 1600, the steps are reversed.

Figure 17:
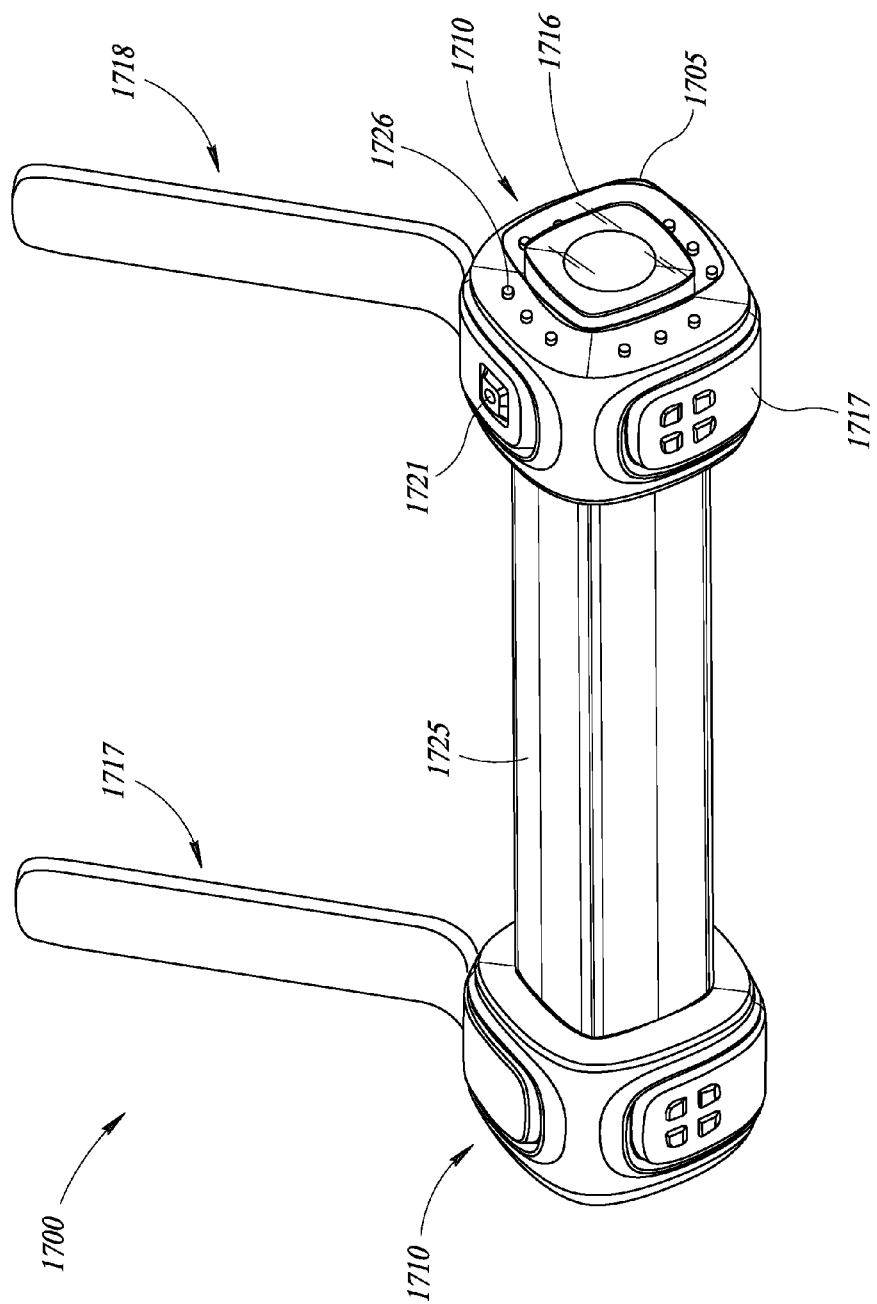
FIG. 17 shows an elongated beacon with flexible latching straps.

FIG. 17 shows another embodiment of an elongated beacon 1700. The end caps 1710 of the beacon 1700 are comprised of two halves 1716 and 1717 that are rotatably coupled together with a hinge (not shown) and releasably coupled to each other with a tension band 1718 in a manner substantially similar to the embodiment disclosed in FIGS. 15 and 16. The end caps 1710 may be further comprised of a lens 1705, light emitting indicators 1726, and a control button 1721. The light emitting indicators 1726 may be in addition to the light emitting indicators 1525. The light emitting indicators 1726 may be LEDs.

Figure 18:
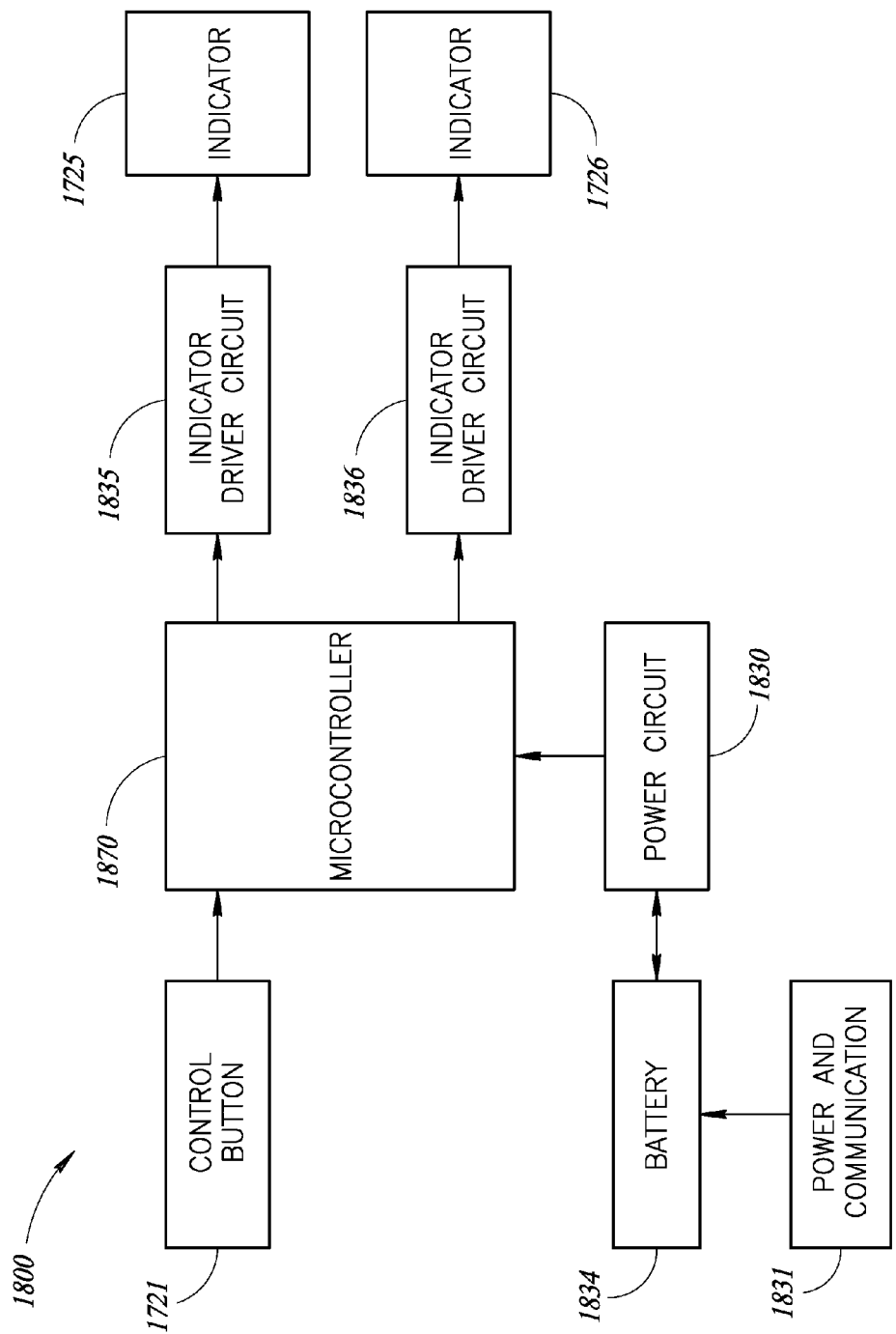
FIG. 18 shows a schematic block diagram of the electrical circuits for a beacon according to an embodiment of the present disclosure.

The beacons 1700 and 1500 may include a control circuit, such as control circuit 1800, shown in FIG. 18. At the heart of the control circuit 1800 is a microcontroller 1870. The microcontroller 1870, and any other microcontroller in the present disclosure may include memory. The microcontroller is electrically coupled to the control button 1721, the indicator driver circuits 1835 and 1836, the indicators 1725 and 1726, the power circuit 1830, the power supply 1834, and the power and communication port 1831.

The microcontroller 1870 may be configured to receive inputs, such as inputs from the control button 1721. The microcontroller 1870 may be configured to power on or off when the control button 1721 is pressed. In addition, when powered on, the microcontroller may be configured to receive differing signals from the control button 1721, for example, a long press of the control button 1721 may cause the control button to send a long signal which may be received by the microcontroller 1870 which may then cause the lighting scheme of the indicators 1825 and 1826 to change; changes in the lighting scheme may include changes to the color of light emitted, the brightness of the light emitted, or cause the emitters to flash on and off. The emitters are controlled by a driver circuit which is in turn controlled by the output from the microcontroller.

The control circuit 1800 may be powered by a power supply 1834, which may be a battery. The battery's power output may go through a supervisory or conditioning circuit 1830 before being provided to the various components of the control circuit 1800, including the microcontroller 1870 and the light emitters 1725 and 1726.

The power and communication port 1831 may provide external power to the control circuit 1800 and in particular, in embodiments where power supply 1834 is a rechargeable battery, the power and communication port 1831 may provide the energy to recharge the power supply 1834. In addition to providing power to the control circuit 1800, the power and communication port 1831 may be configured to facilitate communication between the microcontroller 1870 and an external device, such as a computer.

In one embodiment, the remote may be an application on a mobile device instead of being a stand-alone device. The application may be provided to allow the user to select various audio or visual patterns and program the beacon. In addition, the beacon may transmit its GPS coordinates to the remote so that the user can view the location of the beacon on a map on their mobile device.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A beacon, comprising:
a tube having a first end opposite a second end and a light emitting indicator extending between the first end and the second end; and
a first end cap at the first end of the tube and a second end cap at the second end of the tube, the first and second end caps each having a first end cap portion and a second end cap portion;
wherein the first end cap portion of the first end cap is hinged to rotate with respect to the second end cap portion of the first end cap about an axis parallel to a length of the beacon extending from the first end to the second end and the first end cap portion of the second end cap is hinged to rotate with respect to the second end cap portion of the second end cap about the axis parallel to the length of the beacon extending from the first end to the second end.

2. The beacon of claim 1 wherein the light emitting indicator is an electroluminescent strip.

3. The beacon of claim 1 wherein the first and second end cap portions of the first end cap are releasably coupled together with a tension band.

4. The beacon of claim 3 wherein the tension band includes an aperture and at least one of the first and second end cap portions of the first end cap includes an attachment structure, the attachment structure and the aperture engageable with each other to releasably couple the first and second end cap portions of the first end cap together.

* * * * *